(12) United States Patent
Li et al.

(10) Patent No.: US 7,075,931 B2
(45) Date of Patent: Jul. 11, 2006

(54) METHOD AND APPARATUS FOR ATM ADDRESS RESOLUTION

(75) Inventors: Li Li, Kanata (CA); Todd Douglas Morris, Kanata (CA); Nalin Mistry, Nepean (CA)

(73) Assignee: Nortel Networks Limited, Quebec (CA)

( * ) Notice: Subject to any disclaimer, the term of this patent is extended or adjusted under 35 U.S.C. 154(b) by 984 days.

(21) Appl. No.: 09/832,823

(22) Filed: Apr. 12, 2001

(65) Prior Publication Data

US 2001/0043604 A1    Nov. 22, 2001

Related U.S. Application Data

(63) Continuation of application No. 08/982,311, filed on Dec. 1, 1997, now Pat. No. 6,243,383.

(60) Provisional application No. 60/044,253, filed on Apr. 25, 1997.

(51) Int. Cl.
*H04L 12/56* (2006.01)
(52) U.S. Cl. ............... 370/392; 370/395.1; 370/467
(58) Field of Classification Search ............ 370/392, 370/395.1, 389, 393, 396, 397, 399, 410, 370/465, 466, 467, 471, 474
See application file for complete search history.

(56) References Cited

U.S. PATENT DOCUMENTS

| 5,568,475 | A |   | 10/1996 | Doshi et al. ............. 370/399 |
| 5,592,477 | A |   | 1/1997  | Farris et al. ............ 370/396 |
| 5,757,796 | A |   | 5/1998  | Hebb ................... 370/393 |
| 5,809,501 | A | * | 9/1998  | Noven ..................... 707/7 |
| 5,828,844 | A | * | 10/1998 | Civanlar et al. ......... 709/228 |
| 5,884,297 | A | * | 3/1999  | Noven ................. 370/395.3 |
| 5,892,763 | A | * | 4/1999  | Laraqui et al. ....... 370/395.53 |
| 5,910,954 | A |   | 6/1999  | Bronstein et al. .......... 370/410 |
| 5,917,819 | A | * | 6/1999  | Yang et al. .............. 370/390 |
| 5,930,257 | A | * | 7/1999  | Smith et al. .............. 370/401 |

(Continued)

FOREIGN PATENT DOCUMENTS

WO         96/06492         2/1996

(Continued)

OTHER PUBLICATIONS

ATM Forum: IAN PNNI SIG WATM Working Group, Forum/97-0568, "Introduction of Network Internal Address to Support Reliable Routing and Accounting", Jul. 20-25, 1997.

(Continued)

*Primary Examiner*—Doris H. To
*Assistant Examiner*—Soon D. Hyun
(74) *Attorney, Agent, or Firm*—Hunton & Williams LLP

(57) ABSTRACT

In a generic, end-to-end address resolution methodology, destination addresses in one format are translated into local addresses of different formats for purposes of routing calls across a plurality of interconnected networks which use different address formats. Translation of addresses is accomplished through either database query or by conversion algorithm. To facilitate routing across a particular network, the signaling message of the call is repacked with the local address as the routing address. The original destination address is preserved and carried transparently across that network. The signaling message is then repacked with the destination address as the routing address. Bi-level addressing schemes are supported, so that a network-level destination address and user-level destination address may both be carried transparently across a particular network.

60 Claims, 17 Drawing Sheets

U.S. PATENT DOCUMENTS

| | | | | |
|---|---|---|---|---|
| 5,940,491 | A | 8/1999 | Anderson et al. | 370/230 |
| 5,949,871 | A | 9/1999 | Kabay et al. | 370/229 |
| 6,014,378 | A | 1/2000 | Christie et al. | 370/356 |
| 6,021,126 | A | 2/2000 | White et al. | 370/352 |
| 6,182,141 | B1 * | 1/2001 | Blum et al. | 709/227 |
| 6,243,383 | B1 * | 6/2001 | Li et al. | 370/395.6 |

FOREIGN PATENT DOCUMENTS

| | | |
|---|---|---|
| WO | 97/02682 | 1/1997 |

OTHER PUBLICATIONS

ATM Forum Technical Committee, ATM Forum/97-0752, "Generic Address Transport in PNNIv2.0", Sep. 22-26, 1997.

Bocci et al., "ATM Network Simulation Support for TMN Systems," Third Int'l Conference on Intelligence in Broadband Service and Networks, Oct. 16-19, 1995, pp. 146-158.

Schepers et al., "LAN/WAN interworking in the OSI environment," Computer Networks and ISDN Systems, vol. 23, No. 4, Jan. 1992, pp. 253-266.

Cha et al., "Interconnection of Existing LANs with B-ISDN Using Simple Router Function," Proceedings of the Region Ten Conference, IEEE Tencon, Oct. 19-21, 1993, pp. 211-215.

* cited by examiner

METHOD AND APPARATUS FOR ATM ADDRESS RESOLUTION

BACKGROUND OF THE INVENTION

The present invention relates to address resolution in an asynchronous transfer mode (ATM) communications network. When deploying ATM networks, network providers must deal with the recent proliferation of ATM address types and formats. A network provider has to decide on the type of ATM address to be deployed in its own network, under the influence of administrative, technical, and other factors. For example, ATM End System Addresses (AESAs) may be deployed in some private and public networks because of the difficulty in obtaining native E.164 addresses. For some of the public carriers, native E.164 addresses may be chosen since they already own them. The notion of "public" and "private" is blurred in ATM networks—even so-called "public" ATM networks have segregated address domains that are very different from the traditional telephony public network.

In addition to the different administrative aspects, various addresses are also involved directly with a variety of signaling protocols and routing algorithms. For example, the ATM Forum Private Network-Network Interface (P-NNI) routing protocol runs on the structure of 20 bytes AESA, whereas Broadband ISDN User's Part (B-ISUP) signaling was originally based on native E.164.

One approach to the problem of address resolution has been to use only native E.164 address in public ATM networks, assuming that every public network can route on native E.164. As for connections between public networks and private networks, private networks translate the Network Service Access Point (NSAP) formatted address into a native E.164 address for the public network to route on. Some public networks, however, use NSAP addresses instead of native E.164 addresses. Further, this approach cannot handle number portability issues, and does not provide the internal/external address separation for public carriers. Another approach—resolution based on interface type—is also limited since different network providers may opt for different interfaces and signaling messages to connect networks. These limitations render the prior approaches to address resolution unacceptable.

It is desirable, therefore, to provide an end-to-end address resolution scheme sensitive to the related signaling and routing protocols involved in order to set up connections across different ATM network addressing domains. As yet, no ATM standards provide a complete mechanism adequate for address planning and interworking, which is imperative for ATM networks to scale and interconnect.

It is also desirable to provide a generic end-to-end address resolution scheme applicable to all signaling protocols (e.g., ATM Forum v. ITU-T standards, DSS2 (Digital Signal System #2)-based v. B-ISUP-based protocols) at all different types of ATM standard interfaces to achieve complete ATM network interconnection. It would also be desirable for such a generic scheme to allow ATM switches to handle address interworking without changing the control software for every specific application or interface, for example where one network uses ATM Forum P-NNI and another uses ITU-T B-ISUP.

SUMMARY OF THE INVENTION

This invention satisfies those desires by providing a generic methodology for end-to-end ATM address resolution applicable to all signaling protocols.

A method consistent with the present invention for use with a network comprises the steps of translating the destination address into a local address on which the first network can route the call, repacking the signaling message with the local address as the routing address, routing the call through the first network using the local address, repacking the signaling message with the destination address as the routing address, and forwarding the call to the second network for routing toward the destination address. The method further comprises the step of carrying the destination address across the first network transparently. The method further provides the step of carrying a second destination address across the first network transparently, supporting a bi-level address scheme which includes a network-level and a user-level destination address.

Apparatus and networks are also provided for carrying out the methods consistent with the present invention.

The advantages accruing to the present invention are numerous. The inventive address resolution scheme can be adopted by the signaling protocols for all ATM interface types, such as User-Network Interface (UNI), Interim Interswitch Signaling Protocol (IISP), P-NNI and Q.2931/2971 based on DSS2 protocols and B-ISUP/B-ISDN Inter-Carrier Interface (B-ICI) based on SS7 protocols. Because the scheme is generic, network providers can choose to either maintain their existing configurations without having to reconfigure the network with different ATM interfaces or to change addressing formats in order to resolve the address interworking issues. Network providers can always maintain their internal address format and address scheme independent of the external environment. Further, the address resolution scheme is backward compatible with existing ATM address interworking standards, and can interwork with all switching equipment that supports the existing addressing guidelines. Consequently, the procedures for software upgrade are simplified for the existing ATM networks. Additionally, routing efficiency is improved by minimizing the size of the topology database or routing table when the address space is segmented (i.e., scattered across different network boundaries). Also, the scheme requires no end-to-end agreement on the use of bi-level addressing. Lastly, the scheme allows ATM Name Service (ANS) to be adopted by ATM switches to support name resolution and number portability requirements.

The above desires, other desires, features, and advantages of the present invention will be readily appreciated by one of ordinary skill in the art from the following detailed description of the preferred implementations when taken in connection with the accompanying drawings.

DETAILED DESCRIPTION OF THE PREFERRED EMBODIMENTS

Figure 1:
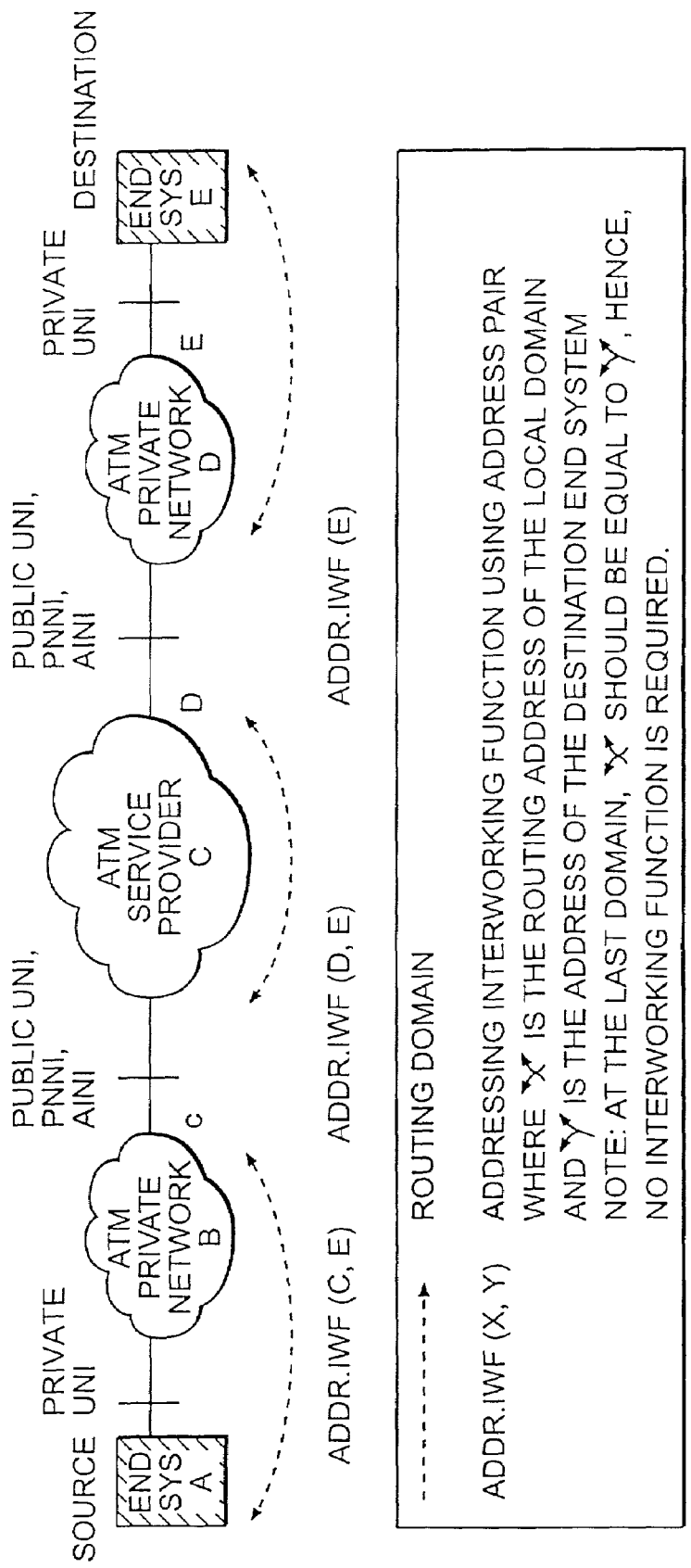
FIG. 1 is a high level diagram of interconnected ATM networks.

The address resolution schemes described below consistent with the present invention are generic address interworking schemes for all ATM networks. The methodologies are independent of the different ATM interfaces (i.e., UNI, P-NNI, B-ICI/B-ISUP and AIM) and utilize primarily the existing address interworking guidelines, such as those specified in known standards. This approach allows network providers to establish their internal network addressing formats and addressing schemes independent of other private or service providers' networks to which they are interconnected, and minimizes the effort to reconfigure the network equipment and their routing tables/Topology Databases (TDB) to support address relocation (i.e., the moving of an address from one network to another network) and a segmented address space across different network boundaries. A bi-level addressing architecture is not required for implementation but is supported. Backward compatibility is ensured by supporting the existing address interworking guidelines.

In an ATM network, a switched virtual circuit (SVC)—a virtual connection set up on demand via a signaling protocol—may be set up across different address domains. If a domain along the routing path of an SVC call fails to route on the called party address because different addressing formats or addressing schemes are used, an address translation or resolution is required to deduce, from the destination address, the correct routing address for the local domain. Once the routing address is obtained, the call can be forwarded to the proper egress port of the local domain. However, the original destination address must be preserved in the connection request so that the next domain downstream can use it to route the call, if required.

The basics of ATM address formats are known to one skilled in this art. Originally defined for the ISDN network, the native E.164 address format consists Of 15 digits coded in IA5 characters and has been adopted by the ATM Forum. The second type of address is the ATM End System Address (AESA), which is a 20-octet string, based on specified NSAP address formats. Currently, three AESA formats are defined in the relevant standards. These three formats are known as the International Code Designator (ICD), Data Country Code (DCC), and E.164 (ISDN numbering plan), which is different from the native E.164 address format. An AESA consists of the initial domain part (IDP) and a Domain Specific Part (DSP). The IDP consists of the Authority and Format Identifier (AFI) which specifies the format of the remainder of the address, and the Initial Domain Identifier (IDI) which defines the address authority. The DSP consists of three fields: the high order DSP (HO-DSP), the end system identifier (ESI), and a selector (SEL) field. Although the SEL field is not used to deliver calls to the end system, it could be used within an end system to differentiate between applications (processes). To minimize the size of routing tables, addresses are often summarized into prefixes for routing. An AESA may thus be denoted as "N.t", wherein "N" presents the prefix that is significant in routing, and "t" represents the remaining bytes.

An address interworking function consistent with the present invention is supported by a procedure which determines the interworking requirements and policies, an address interworking database populated with entries of address/prefix pairs (i.e., interface identifiers for mapping a local routing address or prefix to a destination address or prefix), an algorithm for converting between native E.164 and AESA E.164, and a signaling message (e.g., SETUP in DSS2-based protocols or the Initial Address Message (IAM) in B-ISUP/B-ICI) that can be used to carry the routing and destination addresses to the proper egress port, which may have one or more addresses associated with it.

Figure 2:
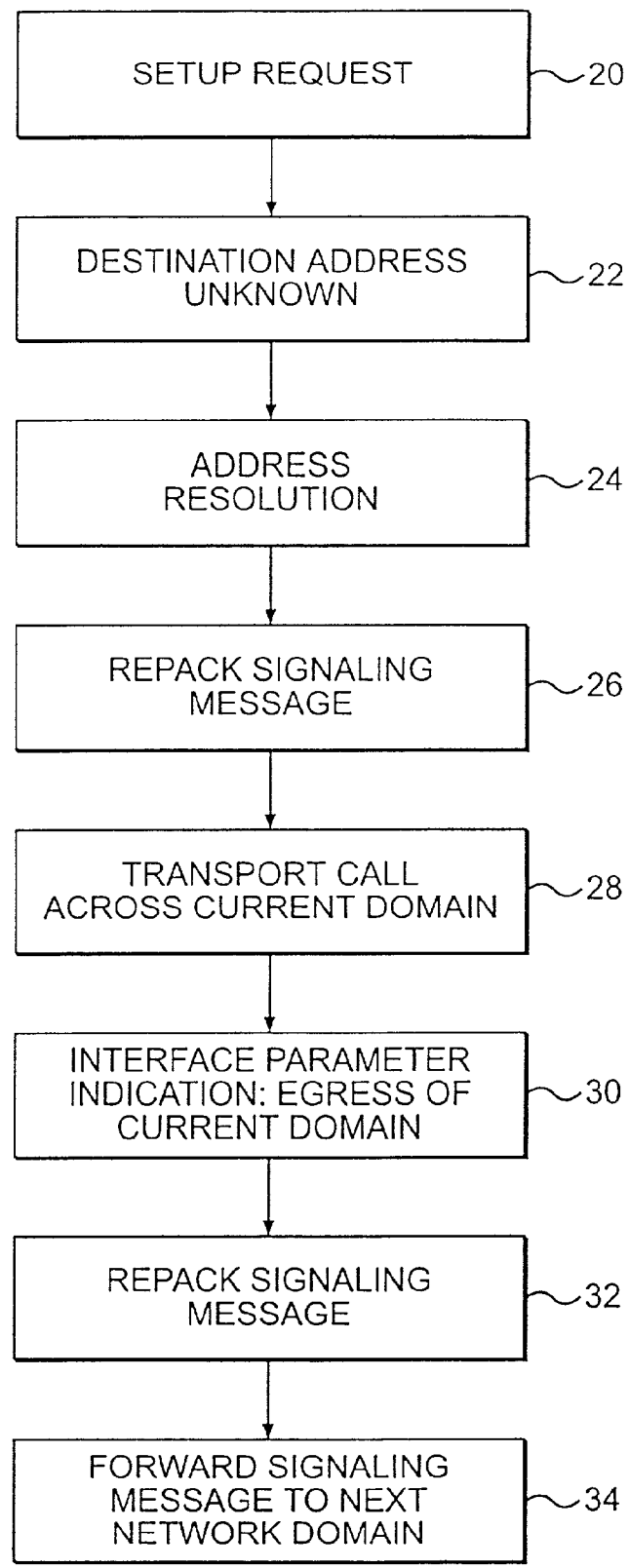
FIG. 2 is a high level flowchart of a scheme for address resolution consistent with the present invention.

FIGS. 1 and 2, a high level network diagram and flowchart, respectively, provide an overview of a scheme for an address interworking function across ATM networks consistent with the present invention. For purposes of this discussion, end system A (ES(A)), private network B (PN (B)), ATM service provider (ASP(C)), and private network D (PN(D)) all have different addressing formats. The dashed lines represent the routing domains, and ADDR.IWF(xy) represents an address interworking function using an interface identifier pair {xy} wherein x is the routing address of the local domain and y is the address of the destination end system. In any domain, if x equals y, then no interworking function is required. Thus, at the last domain (PN(D)) in FIG. 1, x=y=E, and no interworking function is required.

In order to route the call from ES(A) to ES(E) in the presence of the different addressing formats, an address interworking function or address resolution is required along the routing path. In FIG. 2, a call setup request is originated from ATM ES(A) to ATM ES(E) (step 20). ATM PN(B) cannot route on the destination address of ES(E) because PN(B) has a different address format (step 22).

Address resolution for the destination address is performed (step 24) either at the call terminal ES(A) or at the originating switch of PN(B), not particularly shown. An interworking address resolution consistent with the present invention permits selection of an egress port in PN(B) to ASP(C) to route the call toward ES(E). Translation is achieved either by referring to the address interworking database or by executing an address conversion algorithm, as described in greater detail below.

The approach used—database query or conversion algorithm—depends on the networks' addressing formats. If one of the networks employs a native E.164 format and the other network uses an AESA E.164 format, then the known conversion algorithm may be used to obtain the routing address for the local domain from the destination address. Otherwise, i.e., for any other pairing of different address formats, the routing address is obtained by querying an address translation database, which is populated with at least one interface identifier pair.

To improve address independency of different domains and to limit the size of translation databases, the final destination address carried in the call request signaling message may be used for translation. Thus, the address of the egress port in PN(B) is derived from the destination address of ES(E) and is used for routing by the switches in PN(B) to reach the interface to ASP(C). Once resolution is performed, the signaling message is repacked (step 26). The newly obtained address becomes the routing address, and the original destination address is carried transparently across PN(B). The call is then transported across PN(B) (step 28). At the egress of the local domain (step 30), the signaling message is repacked (step 32)—the routing address for the current domain is discarded and the transparently carried original address is replaced as the routing address. The call is then forwarded on to the next network domain (step 34). This process repeats until the call reaches its destination.

All subsequent address domains along the routing path will have to perform address resolution if their addressing formats are different from that of the destination. It will be appreciated by those skilled in the art that a network can have a different addressing "format" from the destination network when, although it may use the same technical format, for example AESA E.164, the network chooses not to configure to the address scheme of the destination network at its network egress ports. In this case, the first network cannot route on the destination address, and the first network must perform address resolution because its addressing "format" is inconsistent with that of the destination network.

Table 1 below summarizes the interworking scenarios between any domain and destination domain with different addressing formats.

TABLE 1

| Domain A Addressing Format | Destination Domain Addressing Format | Requires Address Interworking | Suggested Address Interworking Policy |
|---|---|---|---|
| AESA X | AESA X | NO (Domain A supports routing address of destination domain) | N/A |
| AESA X (e.g. ICD) | AESA Y (e.g. DCC) | YES (Incompatible AESA addresses or Domain A chooses not to configure called address in its routing table/TDB) | Address Translation via table look up, or ATM Name Service (ANS) |
| AESA (ICD/DCC) | Native E. 164 | YES | Address Translation via table look up, or ATM Name Service (ANS) |
| Native E. 164 | AESA (ICD/DCC) | YES | Address Translation via table look up, or ATM Name Service (ANS) |
| AESA E. 164 | Native E. 164 | YES | Address Translation via algorithm converting Native E. 164 to AESA E.164 |
| Native E.164 | AESA E.164 | YES | Address Translation via algorithm converting AESA E.164 to Native E. 164 |

Figure 3:
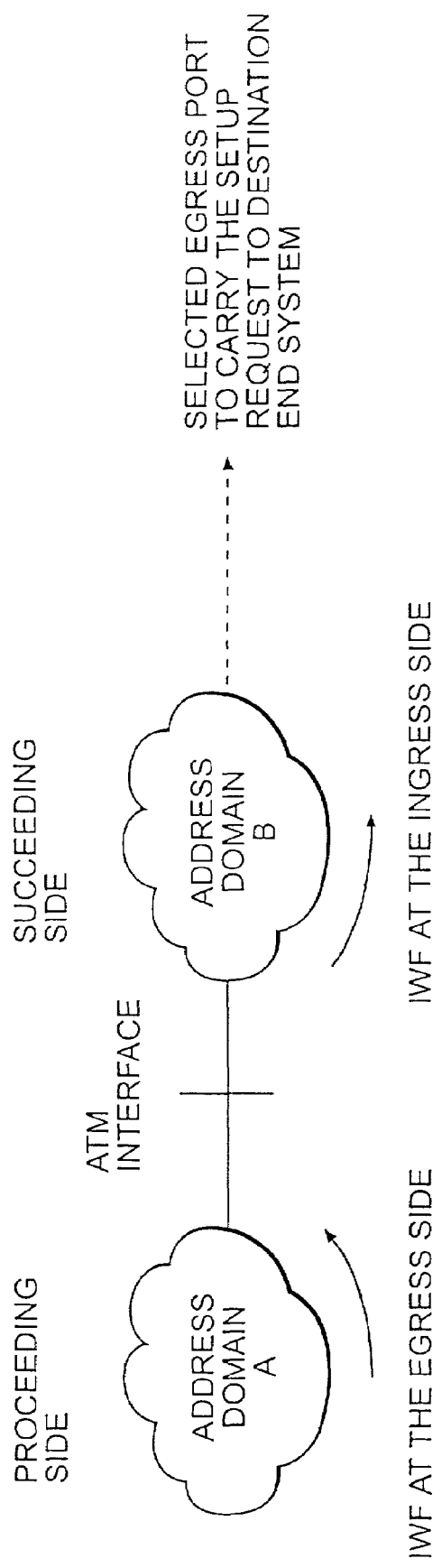
FIG. 3 is a diagram illustrating the concept that address resolution consistent with the present invention can be accomplished at either side of a network.

FIG. 3 illustrates the concept that address resolution can be performed either at the egress side of the network (i.e., the preceding side of the interface) or at the ingress side of the network (i.e., the succeeding side of the interface). However, if address resolution is performed at the egress side of the preceding network, the preceding network must have the knowledge of the gateway address of the succeeding network.

Regardless of which side of the ATM interface performs the address mapping, address resolution consistent with the present invention contemplates use of an address mapping pair (also referred to herein as an interface identifier pair), for routing within the current domain, and an address information transport mechanism, as described below. For purposes of this discussion, the address mapping pair is denoted by {x,y}, where x is the address of the egress port of the routing/local domain and y is the address of the final destination. The destination address y can be either an end system ATM address or a destination (ASP) network-level address (e.g., network-level address in bi-level addressing).

Figure 4:
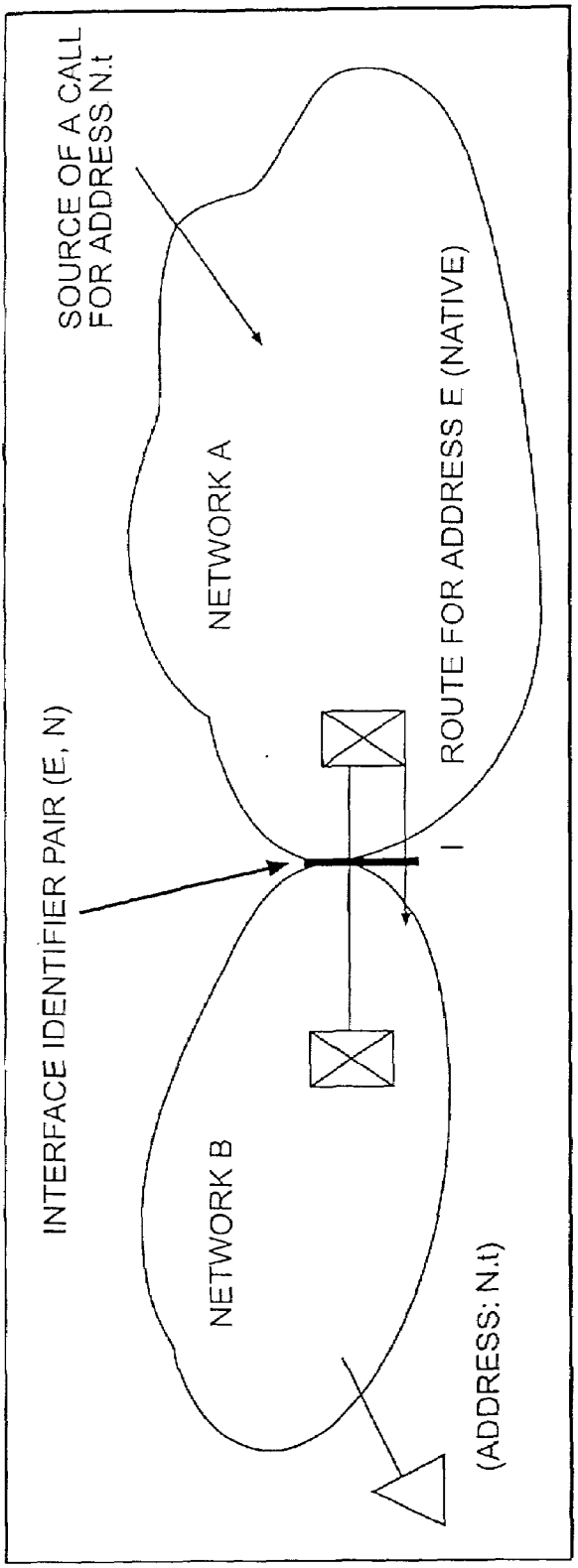
FIG. 4 is a diagram illustrating an interface identifier pair used for address mapping consistent with the present invention.

The purpose of address resolution is to route calls across networks having different address formats or different address schemes. To implement call routing across networks with different address domains, the interface identifier pair, containing the address and/or prefix pair to be used for address mapping, is formed at the network interface, as illustrated in FIG. 4. Calls are then routed by means of the address mapping provided by the identifier pair.

In FIG. 4, assume that network A is running on native E.164 format and network B uses an AESA format, such as N.t, wherein "N" is the prefix summarized out of network B. While many addresses in network B share the same prefix "N", values of "t" may vary. Although a network may inherit more than one prefix summary of addresses, fewer prefixes summarized from one network will minimize the effort involved in configuring the network to support call routing and thus lead to better performance.

As illustrated in FIG. 4, each AESA prefix "N" summarized out of network B is mapped with a native E.164 address "E" to form the pair {E,N}. This mapping pair is an identifier pair for the interface between the two networks in FIG. 4. To reach an AESA N.t that resides in network B, "E" is the corresponding address of the egress port from network A to the interface. Therefore, from network A's perspective, an exterior route for native address E is configured pointing to network B. For network A to route the call destined to a called address AESA N.t, the address resolution function has to substitute the called AESA N.t with native address E from the interface identifier pair {E,N}. Then the switches in network A can route on the address E to reach the interface to network B. Address translation is therefore accomplished based on the interface identifier pair, and the entries in the address translation database can be constructed from the identifier pairs.

In addition to the identifier pair for address mapping, certain address information, for use by a destination network, also needs to be carried across networks. Carrying the necessary address information helps to minimize the need for address translation and reduces the size of the translation table. More particularly, when a call is destined to N.t and sent to network A from a user, the interworking function translates "N.t" into the new address "E" for network A to route onward. At the same time, the address N.t must be carried in the call request signaling message, so that when the call reaches the interface "I" to network B, the original called address N.t can be recovered for use by network B to route the call onward. An address transport mechanism for carrying the destination address is therefore required in the network signaling to achieve end-to-end address interworking.

Figure 5:
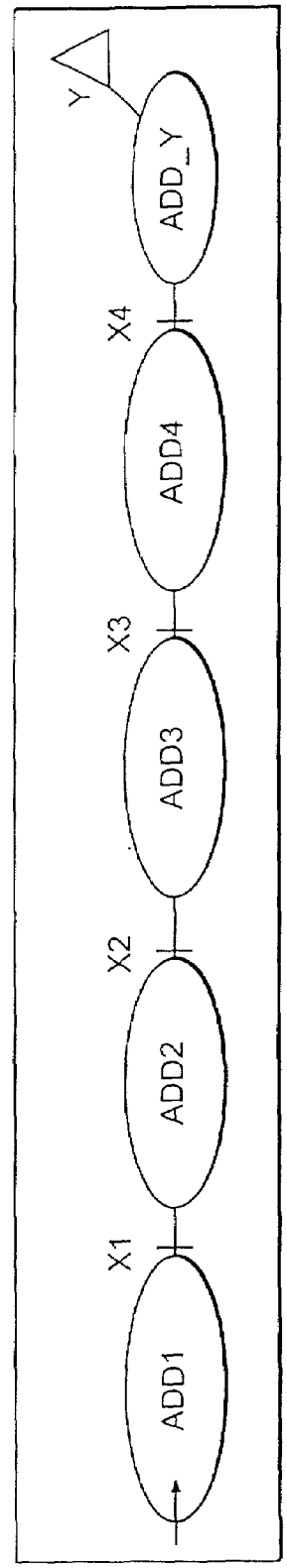
FIG. 5 illustrates address transport across different network domains.

By way of example, assume four address domains, add1, add2, add3, and add4, as shown in FIG. 5, are interconnected to reach the destination domain add_y where the address "Y" resides. In domain add1, {X1, Y} is the interface identifier pair for routing toward address Y. That is, the external interface that can reach Y is identified by the pair {X1,Y}. X1 is the address of the egress port of add1 through which Y can be reached. Similarly, {X2, Y}, {X3, Y} and {X4, Y} are assigned to domains add2, add3 and add4, respectively, as identifier pairs to reach Y.

For a call sent from add1, through add2, add3, add4, and add_y to the destination "Y", address translation in domain add1 replaces the called party address "Y" with "X1". The switches in add1 route on address "X1" to reach the interface while carrying the address "Y". This sends the call from add1 to add2. In domain add2, address "X1" is foreign and cannot be routed on. Another translation is therefore required to obtain the address for routing the call through domain add2. One solution would be to translate from address X1 to address X2, but in order to implement this, domain add2 would have to know about the gateway address X1 in add1. The size of the translation database in each domain might increase dramatically if each domain needs to know all the gateways of all neighbor domains for every destination address or prefix.

Accordingly, to improve the address independency of different domains, and to limit the size of the translation database for easy maintenance and better query performance, translation to obtain a local routing address is preferably done on the final destination address "Y" instead of the gateway address from the preceding domain. Under this approach, address X1 is discarded when entering domain add2,since address X1 is only local to add1. In add2, the destination address "Y" will be translated to obtain address "X2" for local routing in add2. Thus the call is sent to the interface from which the final destination "Y" can be reached. This procedure continues as the call is routed on toward the destination through domains add3, add4, and add_y.

In order to transport the final destination address "Y" across all domains, two address carriage parameters—referred to herein as add_fin and add_loc—are used in the signaling message. The parameter add_fin contains the final destination address, i.e., the address "Y" in the above example. The parameter add_loc contains the local address of the interface to a different domain from which the final destination Y can be reached. The call is routed on the "add_loc" in those domains where the called address "add_fin" does not belong and therefore cannot be routed on.

As noted above, address interworking can be performed using either an address translation database or an address conversion algorithm, depending on the addressing formats. Using the two parameters "add_fin" and "add_loc", the generic address resolution algorithm consistent with the present invention performs as follows. If add_loc is present in the call request signaling message and can be routed on, then no address translation is required. Otherwise, i.e., if the add_loc parameter cannot be routed on because the add_loc format or address scheme is not supported by the current address domain, the algorithm searches for the add_fin parameter in the call request signaling message. If add_fin is not present in the call request signaling message, then add_loc is used for address translation. The known conversion algorithm is used to resolve between AESA E.164 and native E.164 formats. For other combinations of formats, the address translation database is used. If no database entry is found, the translation fails. An appropriate message may be sent informing the appropriate management entity of the failure. Otherwise, the corresponding new address E_ced_add of the gateway is obtained from the conversion algorithm or translation database. Once the new address is obtained, add_fin is set to add_loc and add_loc is set to E_ced_add. The same procedure may take place for the calling party address for the purpose of billing, address screening, etc.

If the add_fin parameter is present in the call request signaling message and if the add_fin format is supported by this domain, then add_loc is set to add_fin since the call can be routed in this domain using the add_fin destination address. If add_fin is present but its format is not supported by this domain, then add_fin is used to perform the address translation, either by using the conversion algorithm between native E.164 and AESA E.164 or by using a translation database. When there is no failure, the corresponding new address E_ced_add is obtained. Add_loc is then set to E_ced_add.

Figure 6:
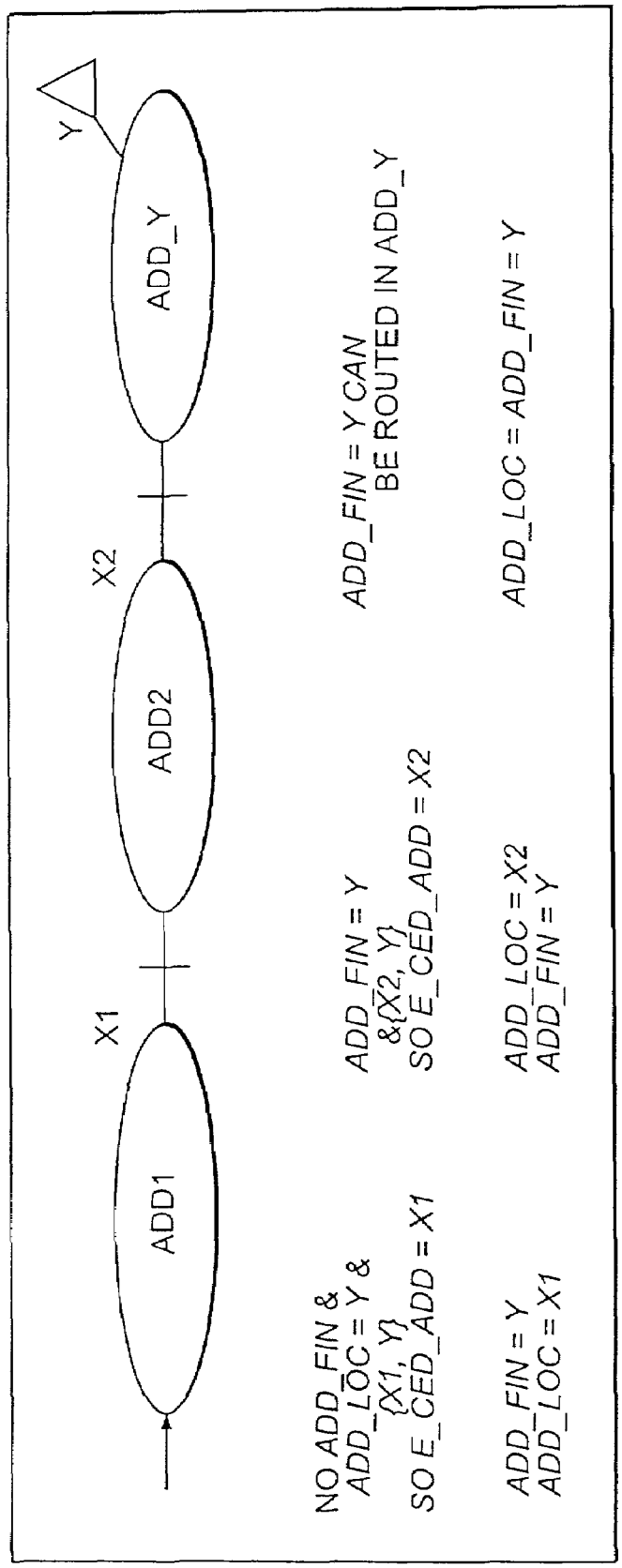
FIG. 6 illustrates an example of address interworking consistent with the present invention.

FIG. 6 illustrates the procedure of the algorithm in a case where the call is sent through add1 and add2 to add_y. Assume the call is originated and sent to add1 with only add_loc=Y, as the calling user does not know which domain the address Y is in. In this situation, the destination address add_fin is not present in the signaling message, and address Y, which cannot be routed on by add1, is used for translation to obtain a routable address E_ced_add=X1. Since X1 will be used to route the call through add1,add_loc is set to X1 and add_fin is set to Y. Next, in add2, the destination address add_fin is present in the signaling message and is equal to Y. Because Y cannot be routed on by add2, Y will be translated to obtain a routable address E_ced_add=X2. Since X2 will be used to route the call through add2, add_loc is set to X2 and add_fin is still set to Y. Lastly, since add_y can route on Y, add_loc is set to add_fin=Y.

The address interworking algorithm consistent with the present invention presented above requires the signaling message to carry add_loc and add_fin for the called address. In current ITU-T and ATM Forum standards, existing parameters or information elements (IEs) in the signaling messages can assume the role of add_loc, while add_fin can be implemented either using existing parameters/IEs or by adding a new parameter, as will be described below. When a new parameter is used for add_fin, it may be implemented as a list of destination addresses, preferably as a last in-first out (LIFO) stack for ease of operation.

Figure 7A:
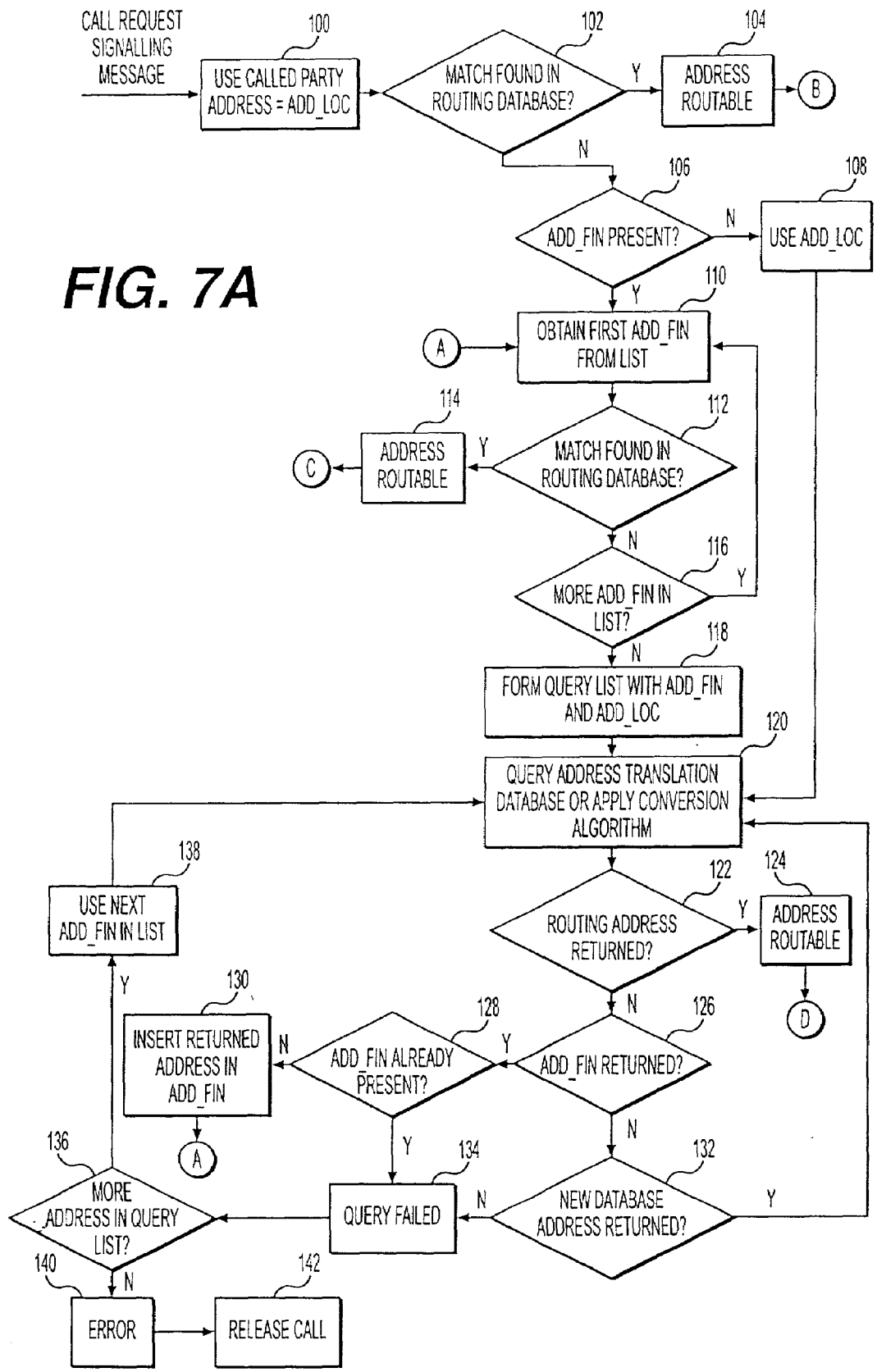
FIGS. 7A–7D illustrate a detailed flowchart for address resolution consistent with the present invention.
Figure 7B:
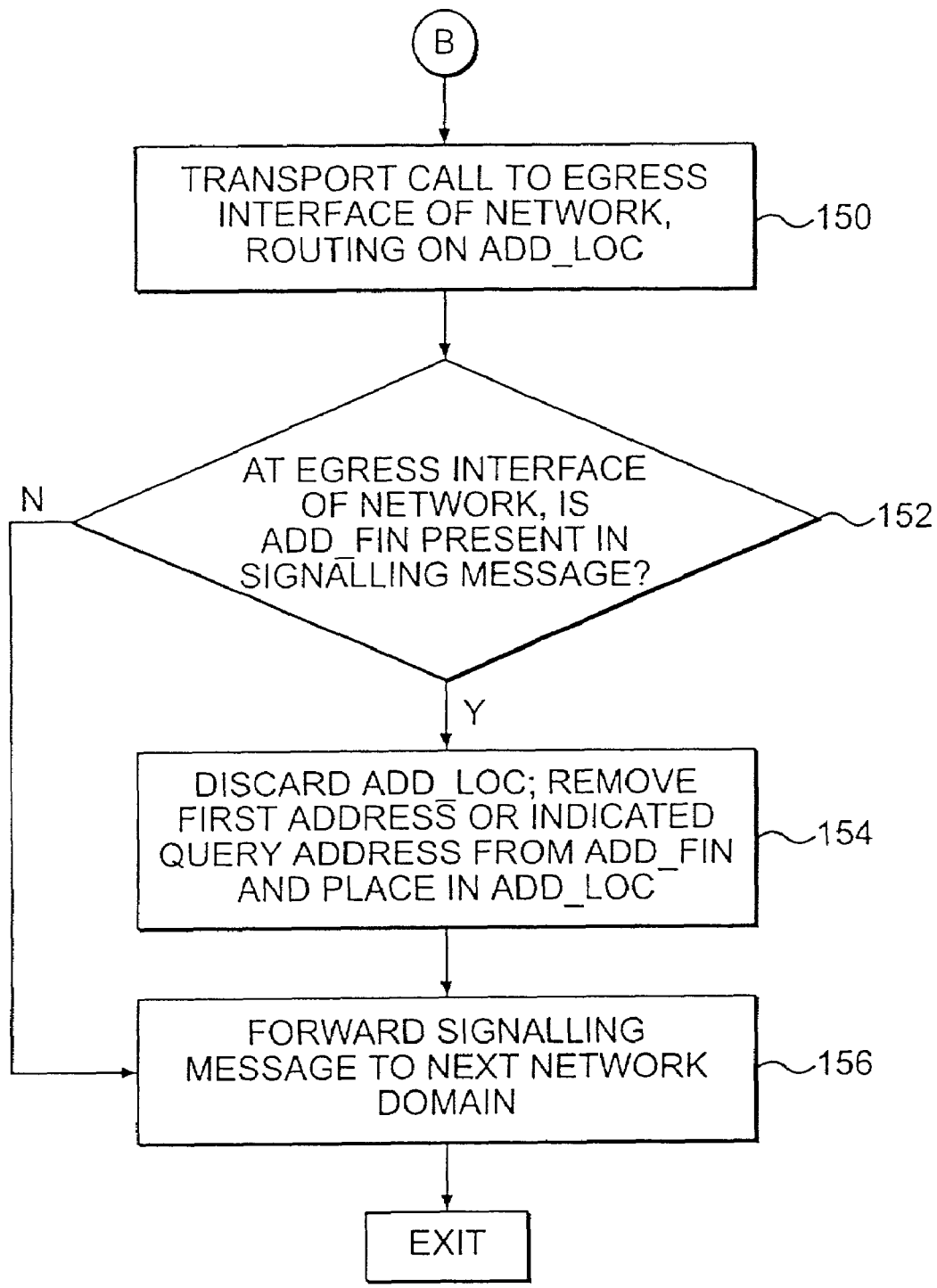

FIGS. 7A–7D present a detailed flowchart for address resolution consistent with the present invention. After receiving a call setup request signaling message, the network switch determines whether add_loc, i.e., the called party address, (step 100) can be routed on by looking for a match in the routing database (step 102). If a match is found, then add_loc is routable in the current domain (step 104) and control flow proceeds to steps 150–156 (FIG. 7B). If no match is found, then add_loc is not routable in the current domain, and the switch determines whether the add_fin parameter is present (step 106). If add_fin is not present, then the switch uses add_loc (step 108) to perform address resolution by querying the address translation database or applying the known conversion algorithm (step 120).

Figure 7C:
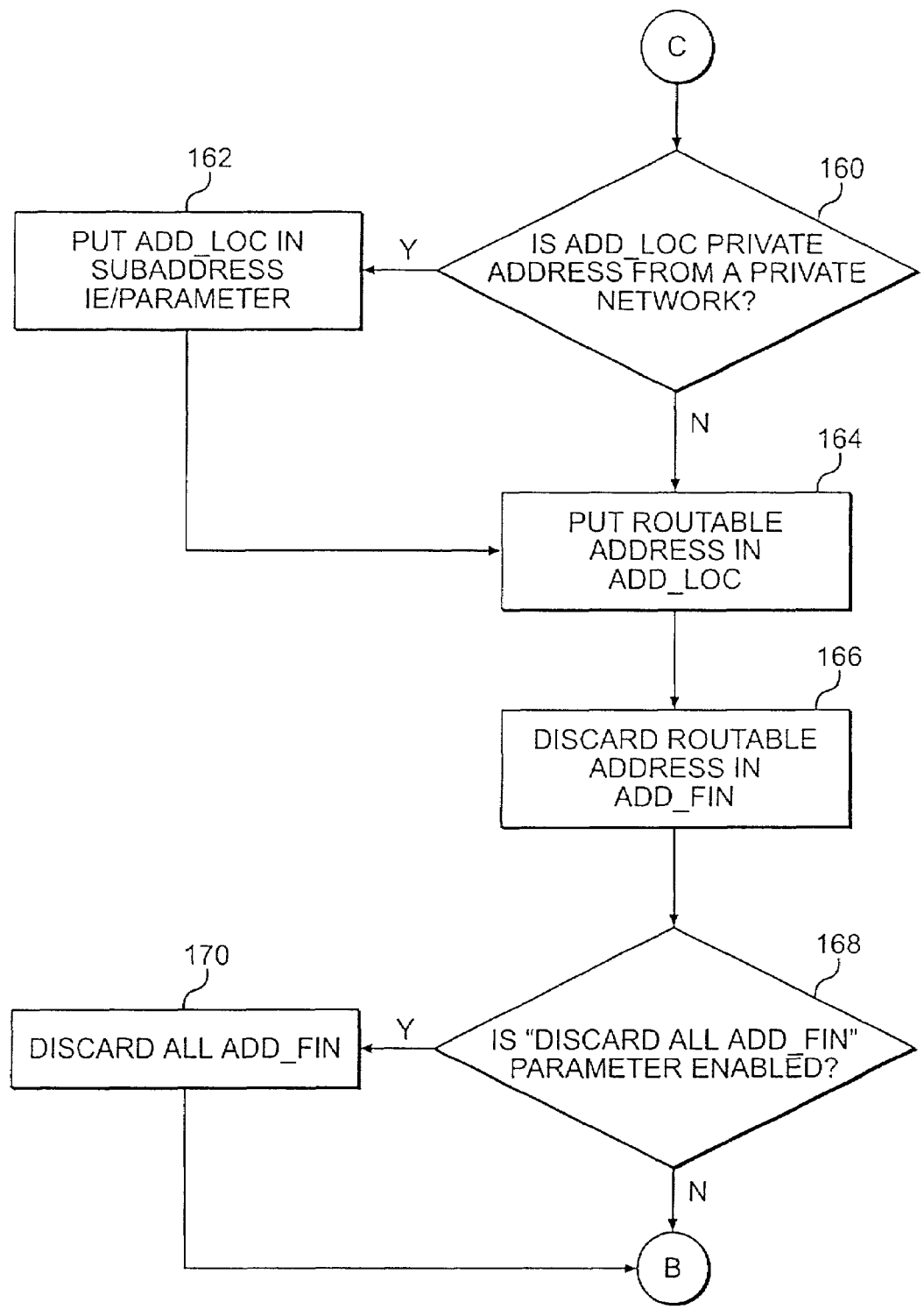

If the add_fin parameter is present (step 106), then the switch obtains the first address from the add_fin parameter (step 110). As previously mentioned, the add_fin parameter may include a list of destination addresses. The switch determines whether the add_fin address can be routed on by looking for a match in the routing database (step 112). If a match is found, then the add_fin address is routable in the current domain (step 114) and control flow proceeds to steps 160–170 (FIG. 7C). If no match is found, then the switch searches for the next address in the add_fin parameter (step 116). If there are more addresses in add_fin, control flow returns to steps 110 and 112 to determine if the next add_fin address can be routed on. When all addresses in the add_fin parameter have been exhausted without finding a match in the routing database, then the switch forms a query list with the addresses in add_fin and add_loc (step 118).

Figure 7D:
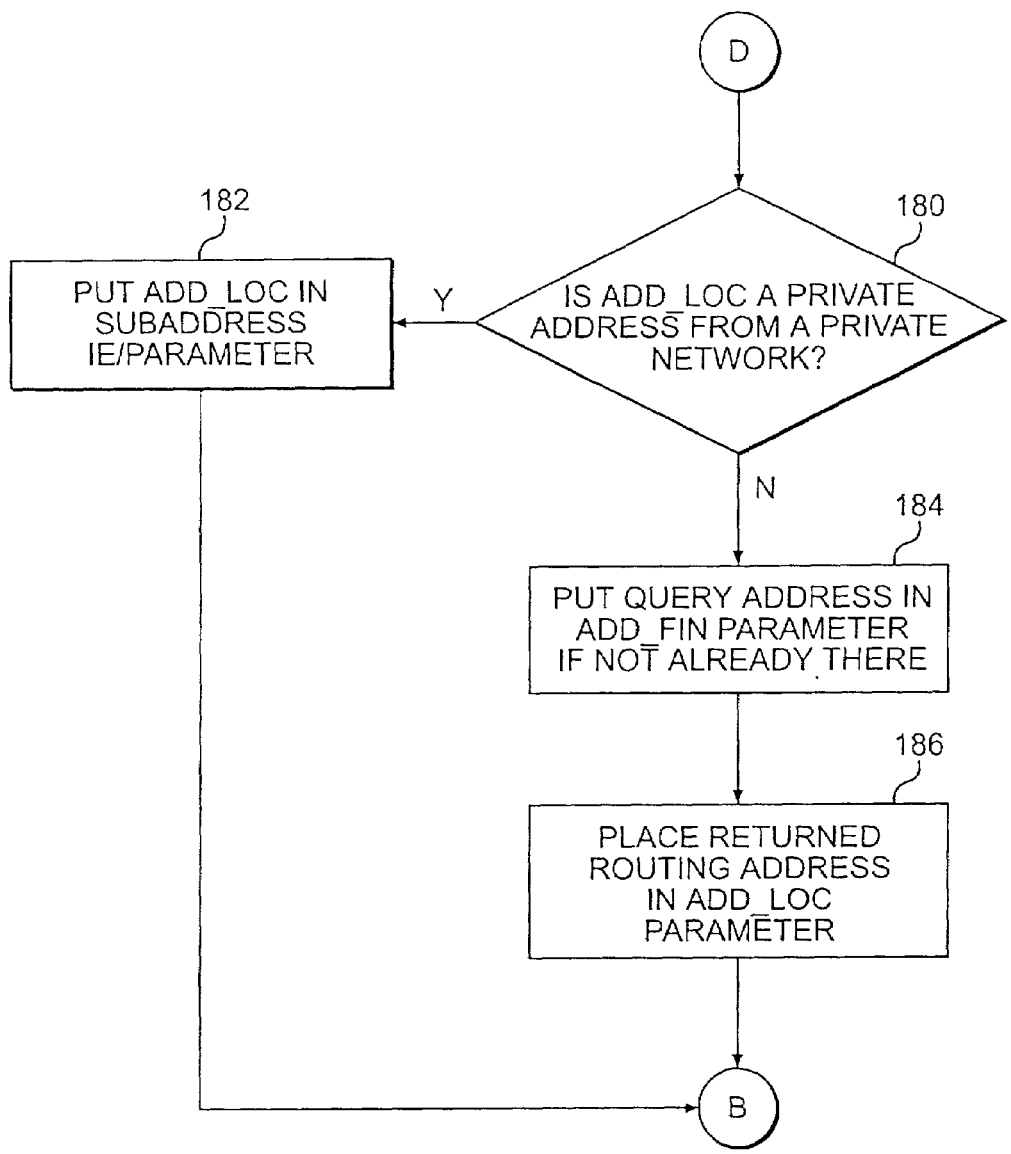

The switch queries the address translation database or, when translating native E.164 to AESA E.164 or vice versa, applies the known conversion algorithm (step 120). If a routing address is returned (step 122), then the switch can route on the returned address (step 124), and control flow proceeds to steps 180-186 (FIG. 7D). If no routing address is returned (step 122), then the switch determines whether add_fin has been returned (step 126). If add_fin is returned, then the switch determines whether add_fin was already present (step 128), as previously determined in step 106. If add_fin was not already present, then the returned address is inserted into the add_fin parameter (step 130), and control flow returns to step 110. If add_fin is returned but was already present (steps 126, 128), then the query fails (step 134). If add_fin is not returned in step 126, then the switch determines whether a new database address was returned (step 132). If so, then the address translation database is queried again with the new database address (step 120). If neither add_fin (step 126) nor a new database address (step 132) is returned, then the query fails (step 134).

When the query of the address translation database fails (step 134), the switch determines whether there are more addresses in the query list used in step 120 (step 136). If so, then the switch uses the next add_fin in the list (step 138) to query the address translation database (step 120). If not, there is an error (step 140), and the call is released (step 142).

When the switch can route on add_loc without address translation (step 104), control flow proceeds directly to steps 150–156 (FIG. 7B). The network transports the call to the egress interface of the network, routing on the address in add_loc (step 150). The network switch at the egress interface of the network then determines whether add_fin is present in the signaling message (step 152). If not, the switch forwards the signaling message to the next network domain (step 156). If an add_fin parameter is present in the signaling message, then the switch discards the address in add_loc and removes the first address from add_fin, placing it in add_loc (step 154). The switch then forwards the signaling message to the next network domain (step 156).

When the switch can route on an address in add_fin without address translation (step 114), control flow proceeds to steps 160–170 (FIG. 7C). First, the network switch determines whether the address in add_loc is a private address from a private network (step 160). If so, the switch puts the add_loc address into the subaddress IE/parameter (step 162) before proceeding to step 164. If add_loc does not contain a private address, the subaddress is not used. The switch then puts the routable address from add_fin into the add_loc parameter (step 164) and discards it from add_fin (step 166). If the user enables the "discard all add_fin" parameter (step 168), then the switch discards all address in add_fin (step 170). Control flow then proceeds to steps 150–156 as described above (FIG. 7B).

When the switch performs address resolution to obtain a routing address (step 124), then control flow proceeds to step 180–186 (FIG. 7D). First, the network switch determines whether the address in add_loc is a private address from a private network (step 180). If so, the switch puts the add_loc address into the subaddress IE/parameter (step 182) before proceeding to step 186. If add_loc does not contain a private address, then the switch puts the query address (i.e., the address which resulted in a successful query in step 120) into the add_fin parameter if it is not already there (step 184). In other words, if add_loc is the query address resulting in a successful query in step 120, then that address is placed in add_fin. Finally, the switch places the routing address returned in step 120 in the add_loc parameter (step 186) before control flow proceeds to steps 150–156 as described above (FIG. 7B). When the switch executes step 154, it removes the query address from add_fin and places it in add_loc.

In one embodiment of the address interworking algorithm consistent with the present invention, the currently defined parameters/IEs carry address information, including add_loc and add_fin, in the signaling messages as illustrated in Table 2 below.

TABLE 2

| Functions | DSS2/UNI/IISP/P-NNI SETUP | B-ICI/B-ISUP IAM |
| --- | --- | --- |
| Address the call is routed on | Called Party Number IE (CdPty) (can be either native E.164 or AESA) | Called Party Number Parameter (CdPty Parm) (if native E.164); or AESA for the Called Party Parameter (AESACdPtyParm) (if AESA) |
| Populate the called party address at the destination network interface | CdPtySub(AESA) | AESACdPtyParm |
| add_fin in interworking | CdPtySub(AESA) | AESACdPtyParm |
| add_loc in interworking | CdPty | CdPtyParm |

In DSS2, UNI, IISP and P-NNI signaling, the call is always routed on the called party number IE, denoted as CdPty, which can carry the called address in either AESA or native E.164 format. Additionally, the called party subaddress is an optional IE under the standards to further specify the address of the called party. Two called party subaddresses are permitted, one in AESA format, denoted here as CdPtySub(AESA), and one in NSAP format. The CdPtySub (AESA) is defined to transparently carry either an AESA in a public network, or a private address in either a public or a private network. The private address is not an ATM address, and is used only by the private network. If carried, the AESA in the CdPtySub(AESA) IE will be promoted into the CdPty IE for the call to be routed on in the destination network.

Consistent with one embodiment of the present invention, the CdPty can assume the role of add_loc because it is the address for the current network to route on. The CdPtySub (AESA), on the other hand, if carrying the AESA, may assume the role of add_fin because it carries the "final" destination ATM address, which will be used for routing in the destination network. Algorithms consistent with the present invention are consistent with the procedures for generating and promoting the called party subaddress IE, CdPtySub(AESA), from/to the called party address IE, CdPty, defined in ATM Forum UNI 3.1 specifications. Thus, from ATM Forum UNI 3.1 and ITU-T Q.2931 specifications, the available called party subaddress IE, CdPtySub(AESA), provides the vehicle in signaling to achieve address resolution across different networks consistent with the present invention. As specified in the ATM Forum UNI 4.0, if CdPtySub(AESA) is present in the SETUP message, it must be generated by the public ATM network from the CdPtySub (AESA) received from either a terminal or a private network. Thus, the CdPtySub(AESA) IE in the SETUP message preserves the final called party address information, thereby meeting the requirements of add_fin consistent with the present invention.

In ATM Forum B-ICI and ITU-T B-ISUP signaling specifications, the called party number parameter, denoted as CdPtyParm, can carry only a native E.164 address. Thus, if the CdPty IE in the SETUP message received from a DSS2-based network contains an AESA, then when the SETUP message is converted to the IAM, another B-ISUP parameter, the AESA for the called party parameter, denoted as AESACdPtyParm, is used to carry the AESA that had been stored in the SETUP CdPty IE. The CdPtyParm will then contain either no digits or a native E.164 address obtained from translation of the original AESA. In this case, the CdPtyParm is only local to the B-ICI/B-ISUP network.

At the destination, when the B-ISUP/B-ICI IAM is to be mapped back to the DSS2/UNI SETUP message, the address in the AESACdPtyParm will be used to populate the CdPty IE in SETUP, even if the CdPtyParm is also present in the IAM, as specified in the B-ICI 2.0 Addendum.

To utilize the AESACdPtyParm as the add_fin parameter in the address interworking algorithm, the CdPty IE in the received SETUP message must contain the final destination address add_fin, not the intermediate or gateway address add_loc used by the previous network for its own routing. The add_fin address should be in AESA format so that AESACdPtyParm will be used to carry it. In a B-ISUP/B-ICI network, the call can be routed either on the CdPtyParm or the AESACdPtyParm. The CdPtySub(AESA) received from the SETUP message can be transparently carried by the B-ISUP IAM if the B-ISUP network agrees to carry it.

To enable the address interworking algorithm across interfaces between networks with different NNI protocols, between DSS2/UNI/IISP/P-NNI and B-ISUP/B-ICI signaling protocols, for example, an adjustment algorithm is needed before the conversion of the SETUP message to an IAM. In the SETUP message, before being mapped into the B-ISUP IAM message, if the CdPtySub(AESA) IE carries the destination network AESA, then the CdPty IE is set to the address in CdPtySub(AESA) and CdPtySub(AESA) is discarded. Thus, when the SETUP message is converted to an IAM according to the standards, the address in the CdPty IE is mapped into the AESACdPtyParm, as described above.

Figure 8:
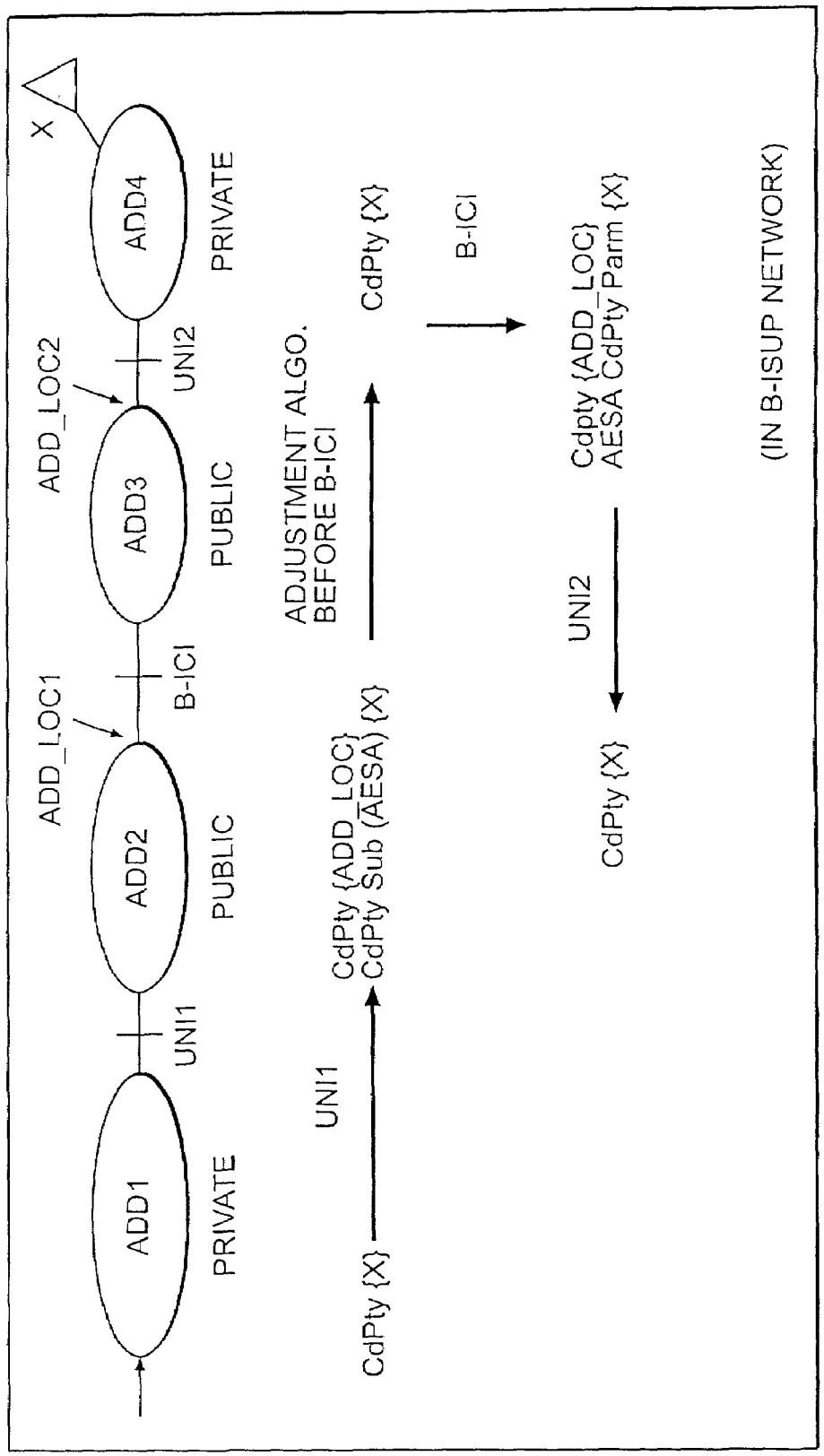
FIG. 8 illustrates an example of address interworking between DSS2 and B-ISUP networks consistent with the present invention.

Given that a calling user dials a called AESA "X", FIG. 8 depicts the course of the address X as it proceeds through address translation and interworking in different networks. Assume that add2 is running on P-NNI within its network and add3 is running on B-ISUP. The calling user dials X, which is initially assigned to the CdPty IE. Assuming that add1 can route on X, the call proceeds to add2,with CdPty still equal to X. Because X is not known by add2, add2 performs address resolution on X to obtain add_loc1, the local routing address for reaching the destination X. The address add_loc1 is assigned to the CdPty IE, the address X is moved into the CdPtySub(AESA) IE, and the call is routed through add_loc1. Before conversion of SETUP to IAM, the adjustment algorithm moves X from CdPtySub (AESA) back into CdPty. Next, in the conversion of SETUP to IAM, X, the address in the CdPty IE, is placed in the AESACdPtyParm. In add3,which cannot route on X, address resolution is performed to obtain add_loc2, the local routing address for reaching X. The address add_loc2 is assigned to CdPtyParm, the address X is moved into AESACdPtyParm, and the call is routed through add_loc2. When the IAM is converted back to a SETUP message, X, the address in AESACdPtyParm moves to the CdPty IE. Finally, add4 routes on CdPty=X to reach the destination X.

Figure 9:
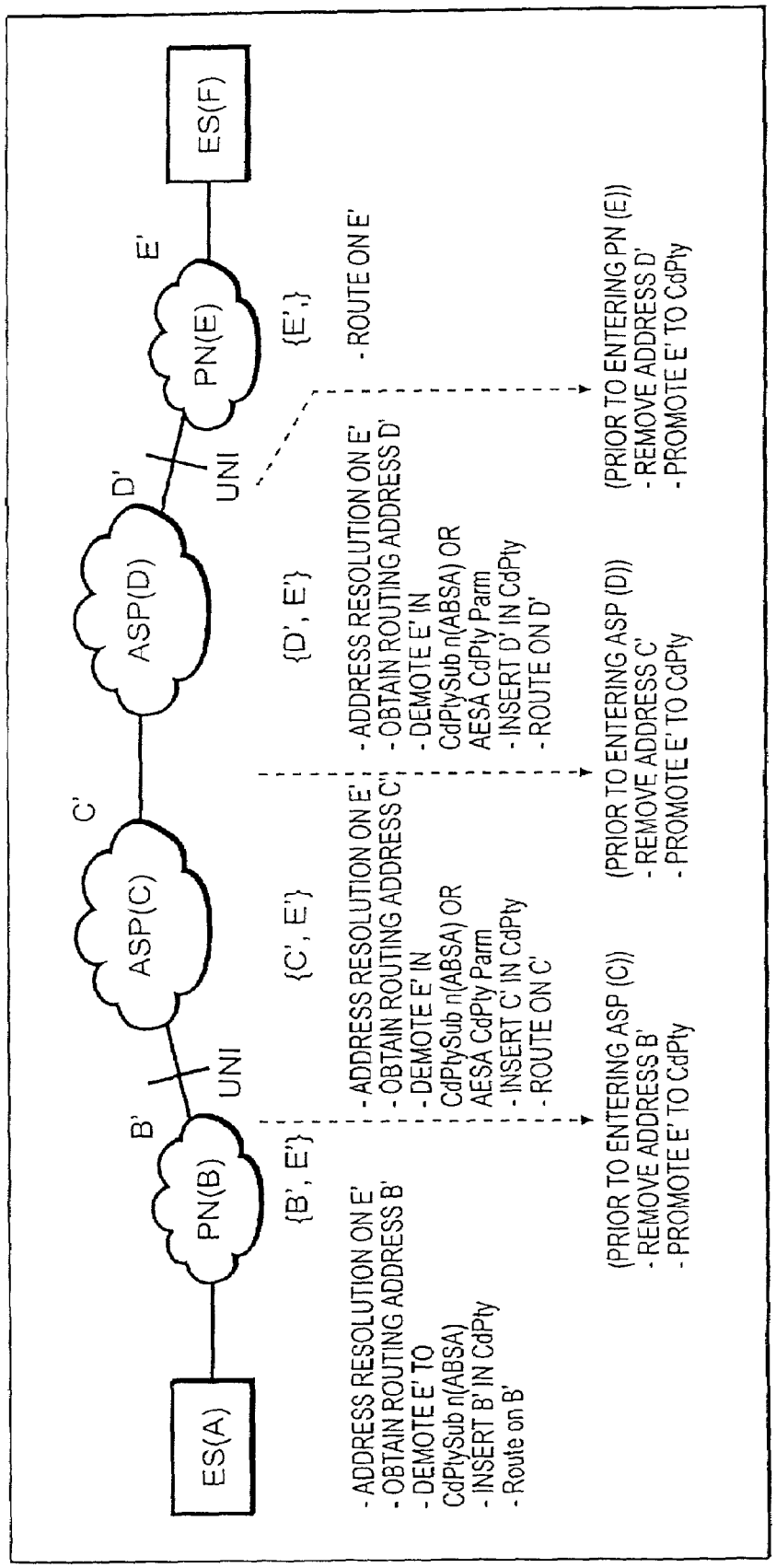
FIG. 9 illustrates an example of address interworking using existing IEs/parameters consistent with the present invention.

FIG. 9, which illustrates a plurality of networks, each having its own addressing format, is useful for describing an address resolution mechanism consistent with an embodiment of the present invention using current signaling parameters and IEs to support address interworking. In this example, end systems ES(A) and ES(F) are interconnected by a plurality of networks, including private networks B and E (PN(B), PN(E)) and ATM service providers C and D (ASP(C) and ASP(D)). The mechanism preserves the final destination address and carries the routing address along the routing path within an address domain.

For the example shown in FIG. 9, the address transport mechanism uses existing IEs and parameters to support address interworking. The called party number IE (CdPty) in the SETUP message, and the called party parameter (CdPtyParm) in the IAM message carry add_loc for routing in the local domain. The AESA-type called party subaddress IE (CdPtySub(AESA)) in the SETUP message and the AESA for the called party parameter (AESACdPtyParm) in the IAM message carry the final destination address add_fin for routing in the final domain. In this case, the final destination address is E'.

The first step in routing toward the destination is to perform address resolution on E'. The address mapping pair is {B', E'}, where B' is the address of the egress port of the routing domain PN(B) and E' is the address of the destination end system. As explained above, the routing address B' may be obtained in one of two ways. If one of the two networks E or B uses a native E.164 format and the other uses an AESA E.164 format, the routing address B' is obtained from destination address E' using the known address conversion algorithm. Otherwise, the switch queries an address translation database which provides the routing address B' in the proper address format based on the format of destination address E'. Destination address E' is demoted to the called party subaddress (CdPtySub(AESA) or AESACdPtyParm—depending on the signaling protocol), routing address B' is inserted into the called party number IE (CdPty), and the call is routed on the B network. Prior to entering ASP(C), the address B' is removed from the called party number IE (CdPty) and the destination address E' is promoted to that IE.

The next routing pair is {C', E'}. The C' routing address is obtained—again, via reference to an address translation database or by applying the known address conversion algorithm—from destination address E', which is demoted to the called party subaddress (CdPtySub(AESA) or AESACdPtyParm—depending on the signaling protocol) and carried transparently across ASP(C). Routing address C' is inserted into the called party number (CdPty or CdPtyParm—depending on the signaling protocol), and the call is routed across ASP(C). Prior to entering ASP(D), the address C' is removed from the called party IE or parameter (CdPty or CdPtyParm) and the address E' is promoted to that IE or parameter. This process continues and repeats as the call is forwarded across the networks on toward the destination address E'.

There are both advantages and disadvantages to using existing IEs and parameters to support address interworking. Advantageously, no new IEs are introduced, and the address resolution procedure is compliant with the existing address IE/parameter processing procedures. However, for a bi-level addressing scheme, where the signaling messages must carry both the destination ASP network-level address D' and the destination terminal (user-level) address E' while each network performs address resolution, the CdPtySub(AESA) parameter will carry D', leaving only the NSAP-type called party subaddress IE (CdPtySub(NSAP)) to carry E', which may violate certain standards guidelines. Further, if ASP(C) runs on B-ISUP with AESA, then C' is an AESA instead of native E.164, and CdPtyParm in the IAM message cannot carry AESA formatted addresses. Because C' has to be carried in the AESACdPtyParm parameter, there is nowhere to carry the destination address E'. Still further, the called party subaddress IE (CdPtySub), which is an optional IE, may not be carried by the B-ISUP/B-ICI ASP network when there is no bilateral agreement between networks. In the original definition for subaddress IEs, a public network (e.g., an ASP) may not look into subaddress IEs, nor translate on them.

Figure 10:
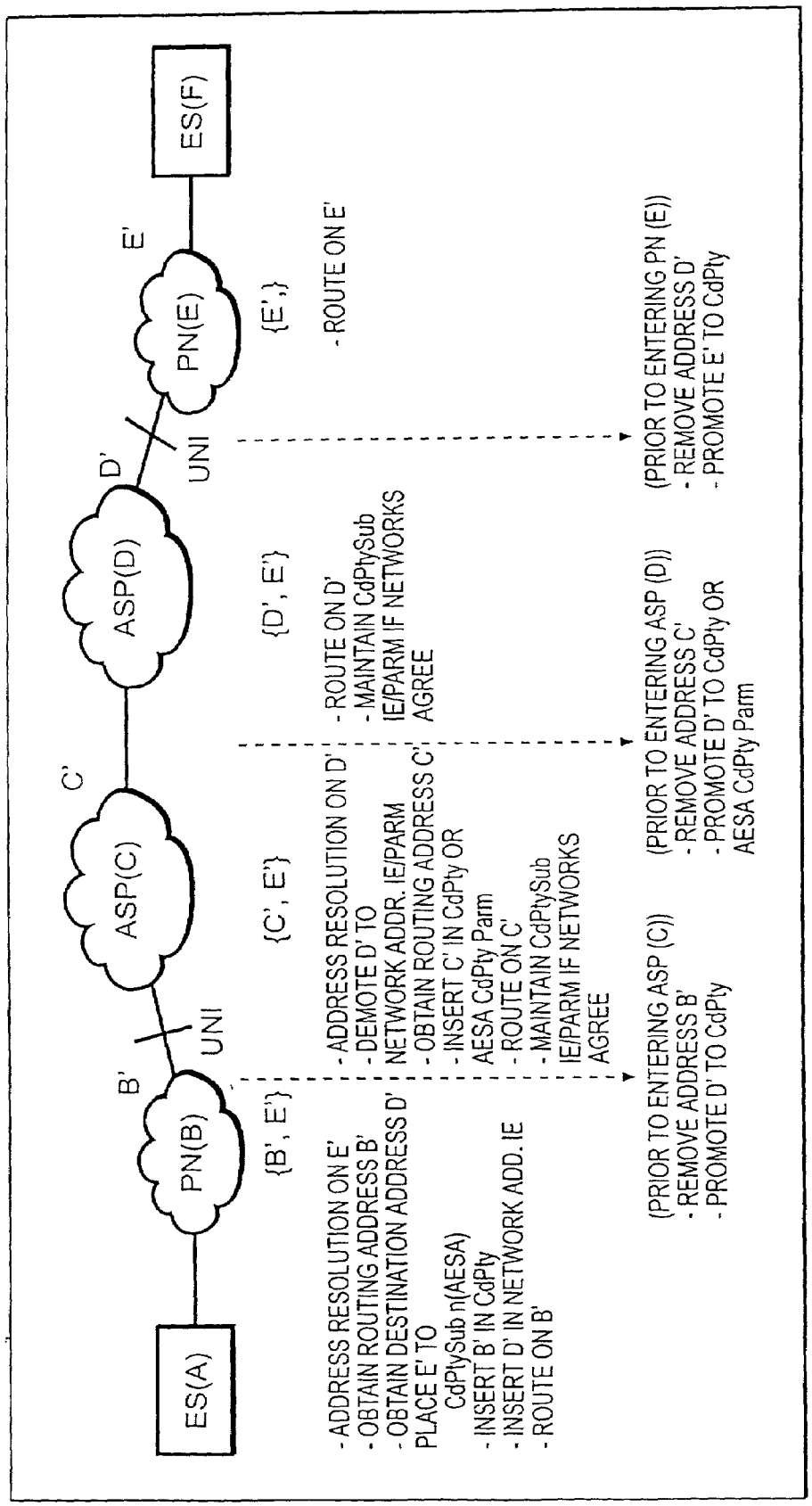
FIG. 10 illustrates an example of address interworking using a new IE/parameter consistent with the present invention.

In light of the drawbacks associated with using only existing IEs and parameters to carry add_fin and add_loc for use in interworking, an alternative address transport mechanism consistent with the present invention may be used (see FIG. 10). Here, address resolution may be performed by introducing a new IE/parameter to the UNI, P-NNI, and B-ISUP specifications. In the example shown in FIG. 10, which implements bi-level addressing, the destination network-level address D' is used by ASP(D) as the address that enters the public UNI and is used to route the call to the destination network PN(E); the address E' is the user-level address for routing the call once in the network PN(E). The new IE, referred to herein as the Network Address (NtAddr) IE/parameter, is used to carry the destination network-level address D', taking on the role of the add_fin parameter. The CdPtySub IE/parameter, either type AESA or NSAP, is used to carry the user-level address E'. The called party address continues to play the role of add_loc.

The first address mapping pair is {B', E'}. A switch in PN(B) performs address resolution on E', and obtains local routing address B' and destination network-level address D' from the destination user-level address E' via reference to an address translation database or by applying an address conversion algorithm, as described above. Destination user-level address E' is placed in the called party subaddress (CdPtySub(AESA)), where it remains until it is promoted to the called party IE (CdPty) prior to the call entering PN(E). After routing address B' is placed in CdPty, and destination address D' is placed in the new NtAddr IE, the call can be routed on address B' in PN(B). Prior to entering the ASP(C) network, destination network-level address D' is promoted and replaces routing address B' in CdPty.

The next address mapping pair is {C', E'}. A switch in ASP(C) performs address resolution on the destination network-level address D' to obtain routing address C'. D' is demoted to the NtAddr IE/parameter, and the C' routing address, obtained from D' via reference to an address translation database or through application of an address conversion algorithm, is inserted into either the CdPty IE or the AESACdPtyParm parameter, depending on the signaling protocol. Thereafter, the call is routed across ASP(C). If all the networks agree to carry the called party subaddress IE/parameter CdPtySub(AESA or NSAP), then the destination address E' is maintained in the called party subaddress IE/parameter. Prior to entering the ASP(D) network, routing address C' is removed from CdPty or AESACdPtyParm and destination address D' is promoted to CdPty or AESACdPtyParm, depending on the signaling protocol.

The next step is to route the call across ASP(D). Since D' is already in CdPty, no address resolution on D' is necessary. Destination address E' is maintained in the called party subaddress IE/parameter if the networks agree to carry it. Prior to entering PN(E), address D' is removed from CdPty and E' takes its place, after which the call is routed on E' to its destination.

This approach—introduction and use of the new IE/parameter NtAddr—has several advantages. It supports ASP (or bi-level) addressing. The end system address E' can now be carried by the called party subaddress (type=AESA if E' is an AESA, or type=NSAP otherwise). Further, if the ASP(C) B-ISUP network runs on AESA but cannot route on the destination AESA E', AESA C' is carried in the AESA for called party parameter (AESACdPtyParm) for routing in ASP(C). The destination AESA D' can now be carried by the new IE/parameter, NtAddr. Additionally, the existing UNI and B-ICI addressing guidelines remain unchanged because the new IE/parameter is not carried across the different network interfaces. Details for handling the signaling IEs/parameters in call processing are provided below. Still further, there is neither overuse nor abuse of subaddress IEs—three types of address information (i.e., the destination network-level address, the destination user-level or terminal address, and the current network routing address) are all carried, and no complicated processing is required. Lastly, even though a new IE/parameter is introduced, the backward compatibility issue is minimal since existing guidelines and specifications are supported.

The address interworking procedures consistent with the present invention, using a new IE/parameter NtAddr and explained by way of example in FIG. 10, may be implemented according to the following guidelines. At the interface from a private network to a public network, the destination address that is used by the ASP for routing (e.g., the network-level address) is carried in the CdPty IE according to addressing standards. Since the use of bi-level addressing has not been finalized, the destination address here is an address that intermediate networks can handle, i.e., an address on which the networks can either route or perform address resolution to obtain the routing address. The destination address can be either the destination network level ASP address, or the destination terminal address (if the networks agree). When the CdPty IE carries the network-level destination address, the user-level terminal address is carried by the CdPtySub(AESA) IE if the user-level terminal address is an AESA properly obtained from the address authority. Otherwise, the user-level terminal address is in NSAP format and is carried by the CdPtySub(NSAP) IE.

In an ASP network, if the address in the CdPty IE in the UNI/IISP/P-NNI SETUP message cannot be used by the current network domain for routing, a network switch performs address resolution on that address. If the address resolution is successful, the original address that was in the CdPty IE is moved to the Network Address (NtAddr) IE in the SETUP message. The CdPty IE is then used to carry the newly obtained routing address.

In an ASP network, if the AESA for the called party parameter (AESACdPtyParm) present in the B-ICI/B-ISUP LAM message cannot be used by the local network for routing, a network switch performs address resolution on the AESACdPtyParm. If the obtained address is native E.164, it is placed in the CdPtyParm. If the obtained address is AESA, then the address in the AESACdPtyParm is demoted to the NtAddr parameter and the newly obtained address is placed in the AESACdPtyParm for routing.

If the only address present in IAM is the CdPtyParm and it cannot be routed by the network, an address translation is performed on the CdPtyParm to obtain the routing address. The address that was in the CdPtyParm is demoted to NtAddr, and the newly obtained address is placed in the CdPtyParm if it is a native E.164, or in the AESACdPtyParm if it is an AESA. The CdPtyParm address is demoted into NtAddr (and not into the AESACdPtyParm) because the CdPtyParm is in native E.164 format. To move CdPtyParm into AESACdPtyParm would require a conversion to embedded NSAP E.164 format. Promoting AESACdPtyParm back to CdPty IE in SETUP would then require a conversion back into native E.164 format. These extra conversion steps would add unnecessary complexity to the procedures by requiring the network switch to determine when an embedded E.164 must be converted back to native E.164.

Consistent with the present invention, the new NtAddr IE/Parameter does not need to be supported, present, or populated at any interface between two networks. The preceding network at its egress should always move the address in NtAddr back into the CdPty IE or parameter. Thus, when traversing from a DSS2 interface to a B-ICI/B-ISUP interface (i.e., mapping SETUP into IAM), the address in the NtAddr IE, if any, is moved into the CdPty IE in SETUP before mapping into the IAM message. When traversing from a B-ICI/B-ISUP interface to a DSS2 interface (i.e., mapping IAM into SETUP), the address in NtAddr, if any, is moved to either the AESACdPtyParm (if AESA format) or CdPtyParm (if native E.164 format), thereby ensuring compatibility with all existing specifications in B-ICI/B-ISUP.

At the UNI, if the calling terminal wants to perform address translation, the same rules are followed. That is, the NtAddr IE/Parameter is used to carry the destination ASP address if it is different from the one on which the current network can route. The CdPty IE carries the address for the current network domain to route (which can be the destination ASP), and the CdPtySub(AESA or NSAP) IE is used to carry the destination private network terminal address if it is not to be routed by the ASP network. A terminal sends either only one address to the switch, (i.e., the destination terminal address), or both the destination terminal address and the destination network-level (ASP) address obtained from address resolution (e.g., using ATM name service (ANS), which provides a mapping between a destination terminal address and the destination network-level (ASP) address). The NtAddr IE/parameter is not carried across the UNI between two networks.

In a private network, if the edge switch cannot route on the address in the CdPty IE received in the SETUP message from the public network, the switch will promote the AESA from the CdPtySub(AESA) IE to the CdPty IE for routing to the called terminal. The above rules consistent with the present invention allow the address translation performed at the ingress side of the network to obtain the routing address for the current network. If a network or terminal is performing address translation for the succeeding network, the address in the NtAddr IE should be promoted to the CdPty IE first, after which the same rules can be applied.

Table 3, shown immediately below, summarizes transport of address information for interworking consistent with the present invention.

TABLE 3

| Address Information to be carried | SETUP message | IAM |
| --- | --- | --- |
| add_loc: Address for routing in the current network | Called Party Address IE (CdPty) | Called Party Number Parameter (CdPtyParm) if address is native E.164 AESA for Called Party Parameter (AESACdPtyParm) if address is AESA |

TABLE 3-continued

| Address Information to be carried | SETUP message | IAM |
|---|---|---|
| add_fin: Destination address used for routing by all service providers' networks with or without translation (e.g., ASP address, network-level address) | Option 1 (existing IEs): Use AESA-type Called Party Subaddress IE (CdPtySub(AESA)) with certain rules<br><br>Option 2: Introduce a new IE (NtAddr) without affecting existing procedures for handling address IEs in UNI and P-NNI | Option 1 (existing parameters): Use AESA for the Called Party Parameter (AESACdPtyParm) with certain rules<br><br>Option 2: Introduce a new parameter (NtAddr) without affecting existing procedures for handling address parameters in B-ISUP/B-ICI |
| User-level private ATM terminal address (AESA) not handled by ASP network but used by private network for routing (e.g. customer-owned address) | AESA-type Called Party Subaddress IE (CdPtySub(AESA)) | Transparently carry AESA-type Called Party Subaddress Parameter |
| User-level private address (NSAP) | NSAP-type Called Party Subaddress IE (CdPtySub(NSAP)) | Transparently carry NSAP-type Called Party Subaddress Parameter |

Several additional interworking scenarios are discussed below (FIGS. 11–15) which adopt the interworking model consistent with the present invention described herein to achieve end-to-end address interworking. In each of these Figures, the type of addressing format for each address domain is denoted by "Addr(<addressing format>)". CdPty represents the UNI/P-NNI/AINI called party IE; CdPtySub (AESA) represents the UNI/P-NNI/AINI called party subaddress that contains an AESA address type; CdPtySub (NSAP) is the UNI/P-NNI/AINI called party subaddress IE that contains an NSAP address type; CdPtyParm is the B-ICI/B-ISUP called party parameter; AESACdPtyParm is the B-ICI/B-ISUP AESA for the called party parameter; CdPtySubParm is the B-ICI/B-ISUP called party subaddress parameter; and NtAddr is the P-NNI/B-ISUP network address IE/parameter.

Figure 11:
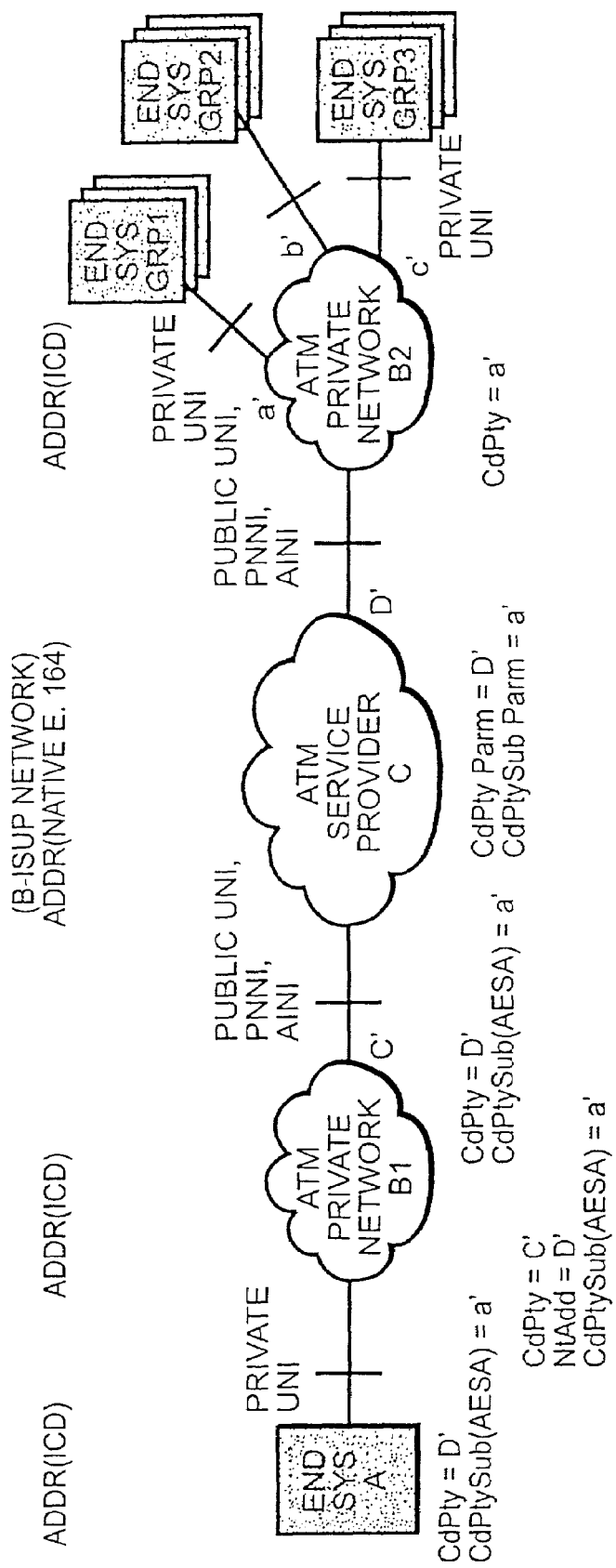
FIG. 11 illustrates an interconnection of private customer networks in which an address resolution scheme consistent with the present invention may be employed.

FIG. 11 illustrates an interconnection of private customer's networks B1 and B2. The public service provider's network (ATM Service Provider ASP(C)) routes only on the network-level address D' instead of the numerous addresses (a', b', etc.) of private end systems. Thus, even if the private addresses are severely segmented such that they cannot be summarized into a few prefixes, the ASP network can still avoid configuring all the segmented addresses in its routing table or topology database (TDB). Only the network-level address D' is configured in the ASP(C) network for routing toward the private network. When numbers in the private networks are relocated, only the address translation database needs to be reconfigured. The switch configuration and the routing TDB can remain unchanged. Thus, the internal addressing scheme of a service provider's network can be independent of the other networks to which it is connected.

The user terminal performs an address resolution (as described above) on terminal address a' to obtain the destination network-level ASP address D'. Thus, both CdPty=D' and CdPtySub(AESA)=a' are sent to the originating switch. CdPty=D' cannot be routed on in network B1, so the originating switch translates D' into C', the routing address for the current domain. The mapping between C' and D' may or may not be open to the end users, as address C' is a network switch configuration address, up to the network B1. D' is moved into NtAddr, and now CdPty is set to C' for routing in the current domain. At the egress, D' is moved back into CdPty.

Figure 12:
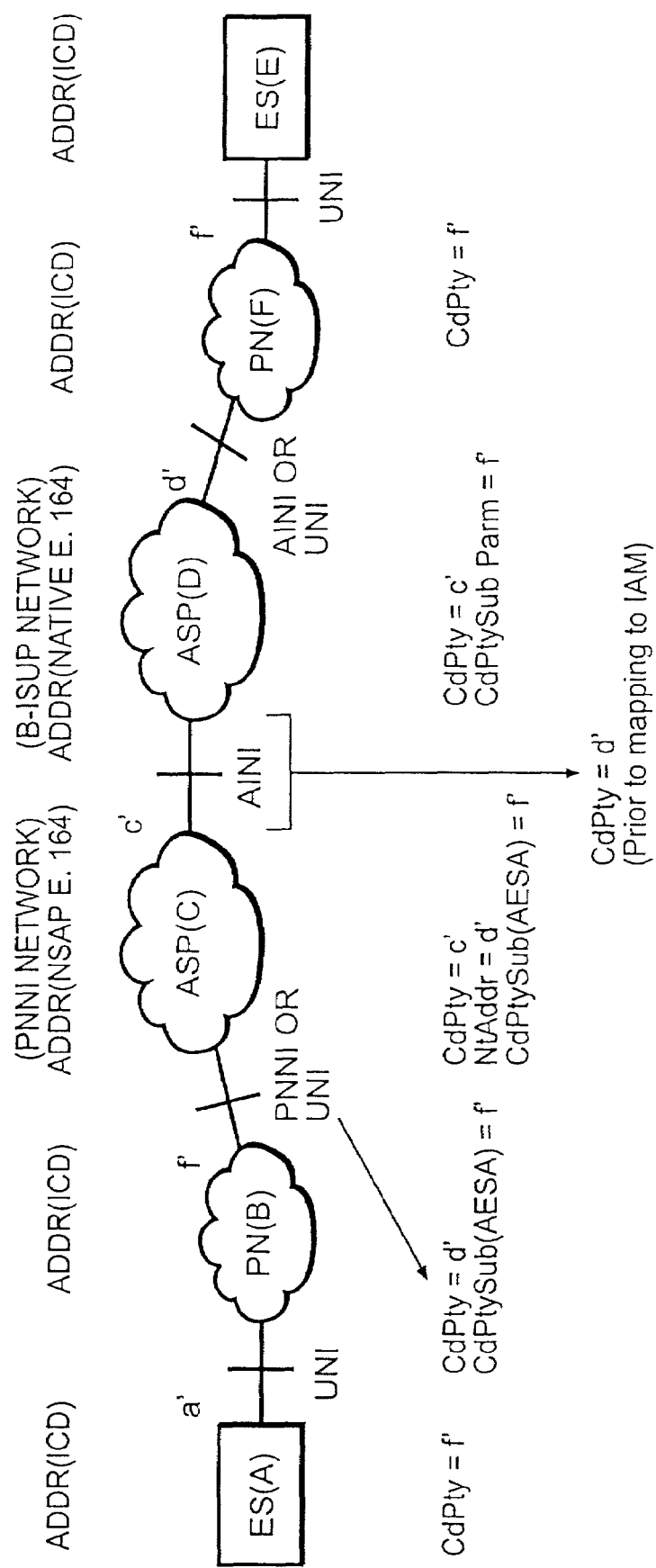
FIG. 12 illustrates an interconnection involving a P-NNI network and a B-ISUP network in which an address resolution scheme consistent with the present invention may be employed.

FIG. 12 represents an ATM address interworking scenario across a P-NNI network, ASP(C), and a B-ISUP network, ASP(D), each of which keeps its internal address scheme confidential and does not configure any other addresses. Address interworking consistent with the present invention does not restrict the address format or scheme that an intermediate network can apply in its internal network. Each intermediate network routes on or translates only the destination address or network-level address. Therefore, one parameter, e.g., NtAddr, is sufficient to support an independent internal addressing format or scheme for each individual network. Additional new IEs or parameters for more address information in the signaling message would only increase the complexity of call processing and impact call setup performance.

Figure 13:
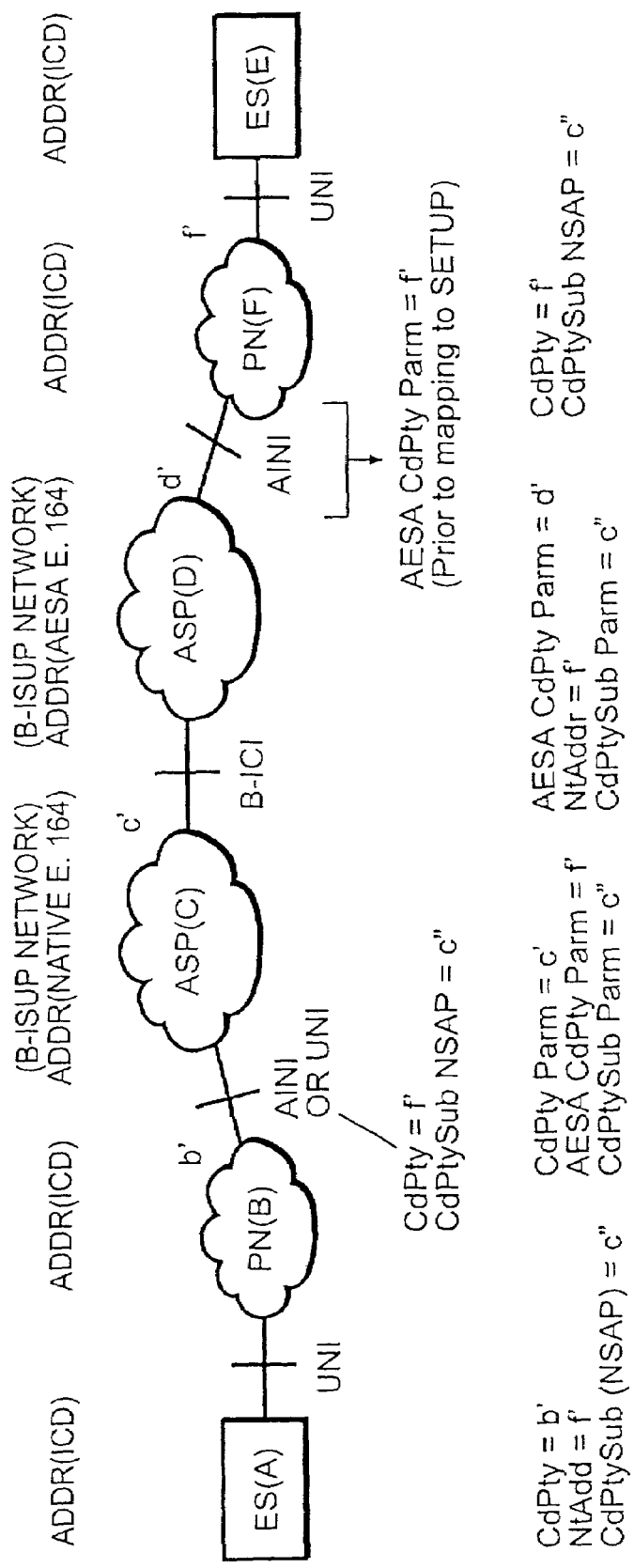
FIG. 13 illustrates an interconnection of B-ISUP networks in which an address resolution scheme consistent with the present invention may be employed.

In FIG. 12, d' is the network-level destination address on which the service providers networks route to forward the call to the destination private customer's network. If networks want to route directly on the end system address (i.e., f), the interworking scheme also works, as will be shown below (FIG. 13, discussed below). In FIG. 12, ASP(C) translates the network-level destination address d' into c' for routing in ASP(C). CdPty is set to c' for local routing, and d' is demoted to NtAddr for maintenance within ASP(C). Prior to mapping the SETUP message into the B-ISUP IAM message, d' is promoted back into CdPty. When SETUP is mapped into IAM at the interface between the P-NNI network ASP(C) and the B-ISUP network ASP(D), d', the native E.164 address in CdPty, is mapped into CdPtyParm, and the end system address f, which is being carried transparently across the networks, is mapped from CdPtySub (AESA) into CdPtySubParm.

The scenario in FIG. 13 depicts an interworking scenario across two B-ISUP networks, ASP(C) and ASP(D), where routing via the network-level address is not enforced and the call is routed on the end system address f. This shows the flexibility of the inventive address resolution which can work without requiring any global agreement on the addressing among different networks. The NSAP subaddress e" required for routing at the end system ES(E) is carried transparently across the networks in CdPtySub(NSAP) and CdPtySubParm. Within ASP(C), which runs on native E.164, AESACdPtyParm can play the role of add_fin to maintain the destination address f while CdPtyParm is used for routing in the local domain. However, within ASP(D), which runs on AESA E.164, AESACdPtyParm must be used for routing in the local domain. Therefore, the new parameter NtAddr is required to store the destination address f' within ASP(D).

Figure 14:
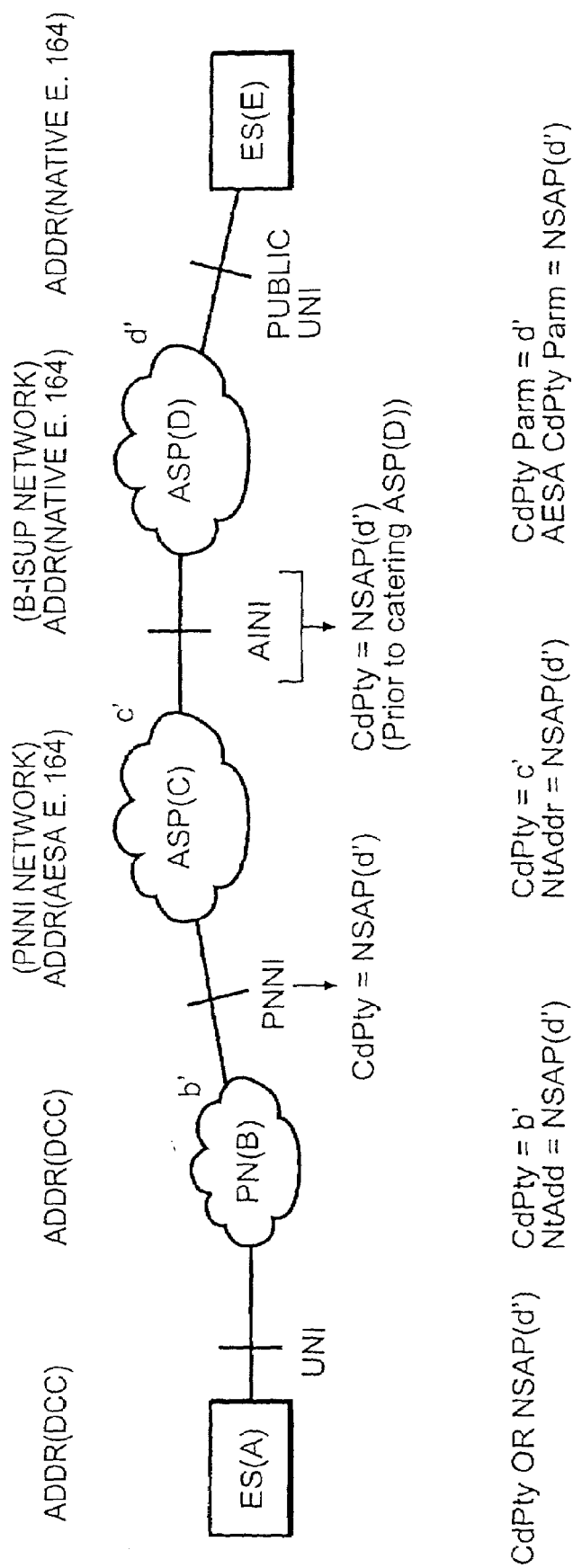
FIG. 14 illustrates a second interconnection involving a P-NNI network and a B-ISUP network in which an address resolution scheme consistent with the present invention may be employed.

FIG. 14 represents an ATM address interworking scenario for a public UNI, where the P-NNI network ASP(C) runs on AESA E.164 and the B-ISUP network ASP(D) runs on native E.164. If ASP(C)'s address scheme is compatible with that of ASP(D), then the gateway address c' in ASP(C) can be the embedded NSAP format of the destination address d' so that no address translation or NtAddr is needed in ASP(C). ASP(C) would then route directly on CdPty=NSAP(d'). Otherwise, if ASP(C) configures its own c' on the gateway switch, without making it compatible with ASP(D)'s address scheme, address resolution is needed as shown, using NtAddr to store the destination address d'. ASP(D) can also execute the known conversion algorithm to obtain the native E.164 address d' from the embedded NSAP(d'). Since address resolution/translation may impact call performance, it is recommended that the ASP networks make their address formats and schemes as compatible as possible to avoid translation, especially in the future to support global connectivity.

Figure 15:
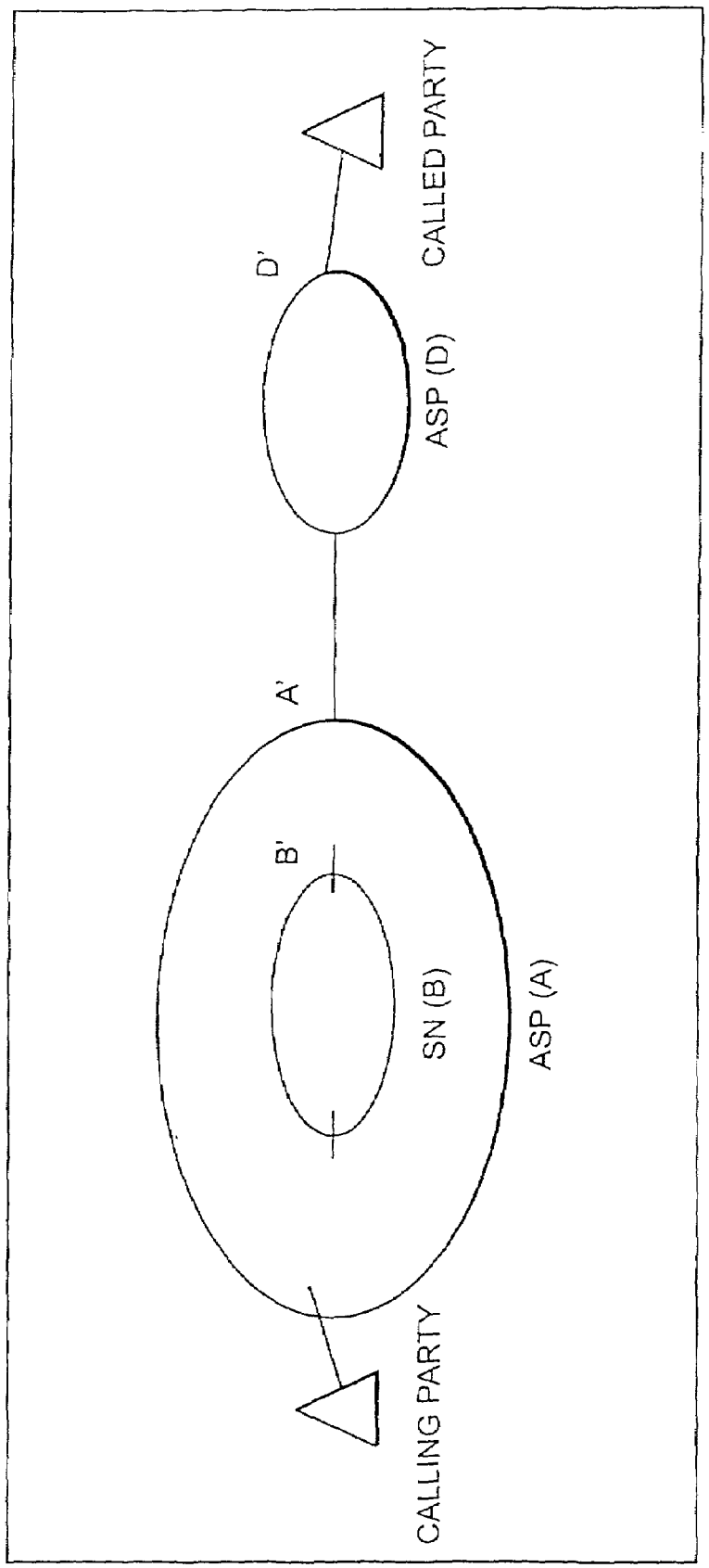
FIG. 15 illustrates an interconnection between two networks, the first containing a subnetwork entirely within itself, in which an address resolution scheme consistent with the present invention may be employed.

FIG. 15 represents an ATM address interworking scenario in which a network ASP(A) contains entirely within it a subnetwork SN(B). A calling party initiates a call to the called party, which is connected to ASP(D) at address D'. Consistent with the present invention, the ingress switch of ASP(A) performs address resolution on D' to obtain A', using the identifier pair {A', D'}. The parameter add_loc is set to A', and add_fin is set to D'. SN(B) cannot route on either add_loc=A' or add_fin=B' because it is contained entirely within ASP(A), so the ingress switch of SN(B) performs address resolution on add_loc=A' to obtain B' as the routing address. The add_loc parameter is set to B', and the add_fin parameter, implemented as a LIFO stack, now contains {A', D'}. When the call reenters ASP(A) from SN(B), ASP(A) can route on A', the first address in add_fin. Thus, add_loc is set to A' for routing within ASP(A), and A' is removed from add_fin, leaving only D' in the add_fin parameter. Finally, ASP(D) can route on D' without address translation.

The examples shown in FIGS. 11–15 are illustrative of interworking scenarios which can be handled by the address resolution described herein that is consistent with the present invention. In one embodiment consistent with the present invention, no new signaling IEs or parameters are required. In another embodiment consistent with the present invention, a new IE/parameter, referred to herein as NtAddr, is introduced. The new IE/parameter enables address resolution when networks support bi-level addressing (i.e., both the network-level address and private ATM terminal address). The new IE/parameter also enables interworking for a B-ISUP network that routes internally on AESA but does not configure to other networks' AESA addresses. Because the use of the new IE/parameter is internal to each network, address resolution schemes consistent with the present invention can interwork with a network that has no capability of supporting the new IE/parameter. Thus, the scheme ensures the backward compatibility with existing addressing guidelines.

It will be appreciated by those skilled in this art that various modifications and variations can be made to the address resolution strategy consistent with the present invention described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A method for routing a call across a first ATM network toward a second ATM network, each network having an addressing format, the addressing format of the first network being different from the addressing format of the second network, the call having an associated signaling message specifying a destination address in the second network, the method comprising the steps of:

translating the destination address into a local address in the addressing format of the first network;

repacking the signaling message with the local address as a routing address by demoting the destination address from a first signaling message parameter to a second signaling message parameter and inserting the local address into the first signaling message parameter;

routing the call through the first network using the local address; and repacking the signaling message with the destination address as the routing address.

2. The method of claim 1, further comprising the step of: forwarding the call toward the second network.

3. The method of claim 1, wherein the step of translating the destination address into a local address includes the substep of:

querying an address translation database populated with an address interface identifier pair to obtain the local address.

4. The method of claim 1, wherein the step of translating the destination address into a local address includes the substep of:

querying an address translation database populated with an address interface identifier pair to obtain the local address, wherein the interface identifier pair specifies as the local address the address of an egress port in the first network.

5. The method of claim 1, wherein the step of translating the destination address into a local address includes the substep of:

querying an address translation database populated with an address interface identifier pair to obtain the local address, wherein the interface identifier pair specifies as the local address the address of an egress port in the first network and specifies the destination address, and wherein the local address corresponds to the destination address such that routing the call to the local address causes the call to be routed toward the second network.

6. The method of claim 1, wherein the step of translating the destination address into a local address includes the substep of:

applying a conversion algorithm to the destination address to obtain the local address.

7. The method of claim 1, wherein the step of translating the destination address into a local address includes the substep of:
applying a conversion algorithm to the destination address to obtain the local address, wherein the local address corresponds to the destination address such that routing the call to the local address causes the call to be routed toward the second network.

8. The method of claim 1, wherein the step of routing the call through the first network includes the substep of:
carrying the destination address transparently across the first network.

9. The method of claim 8, wherein the signaling message further specifies a destination address in an end system beyond the second network, and wherein the step of routing the call through the first network further includes the substep of:
carrying the end system destination address transparently across the first network.

10. The method of claim 8, wherein the signaling message further specifies a destination address in an end system beyond the second network, wherein the destination address is a network address and the end system destination address is a user address, and wherein the step of routing the call through the first network further includes the substep of:
carrying the end system destination address transparently across the first network.

11. The method of claim 1, wherein the step of repacking the signaling message with the destination address includes the substeps of:
discarding the local address from the first signaling message parameter; and
promoting the destination address to the first signaling message parameter.

12. An apparatus for use in routing a call across a first ATM network toward a second ATM network, each network having an addressing format, the addressing format of the first network being different from the addressing format of the second network, the call having an associated signaling message specifying a destination address in the second network, the apparatus comprising:
an address resolution server for translating the destination address into a local address in the addressing format of the first network;
means for repacking the signaling message with the local address as a routing address by demoting the destination address from a first signaling message parameter to a second signaling message parameter and inserting the local address into the first signaling message parameter;
means for routing the call through the first network using the local address; and
means for repacking the signaling message with the destination address as the routing address.

13. The apparatus of claim 12, further comprising:
means for forwarding the call toward the second network.

14. The apparatus of claim 12, wherein the address resolution server includes:
means for querying an address translation database populated with an address interface identifier pair to obtain the local address.

15. The apparatus of claim 12, wherein the address resolution server includes:
means for querying an address translation database populated with an address interface identifier pair to obtain the local address, wherein the interface identifier pair specifies as the local address the address of an egress port in the first network.

16. The apparatus of claim 12, wherein the address resolution server includes:
means for querying an address translation database populated with an address interface identifier pair to obtain the local address, wherein the interface identifier pair specifies as the local address the address of an egress port in the first network, and wherein at least one interface identifier pair further specifies the destination address, the local address corresponding to the destination address such that routing the call to the local address causes the call to be routed toward the second network.

17. The apparatus of claim 12, wherein the address resolution server includes:
means for applying a conversion algorithm to the destination address to obtain the local address.

18. The apparatus of claim 12, wherein the address resolution server includes:
means for applying a conversion algorithm to the destination address to obtain the local address, wherein the local address corresponds to the destination address such that routing the call to the local address causes the call to be routed toward the second network.

19. The apparatus of claim 12, wherein the means for routing the call through the first network includes:
means for carrying the destination address transparently across the first network.

20. The apparatus of claim 19, wherein the signaling message further specifies a destination address in an end system beyond the second network, and wherein the means for routing the call through the first network further includes:
means for carrying the end system destination address transparently across the first network.

21. The apparatus of claim 19, wherein the signaling message further specifies a destination address in an end system beyond the second network, wherein the destination address is a network-level address and the end system destination address is a user-level address, and wherein the means for routing the call through the first network further includes:
means for carrying the end system destination address transparently across the first network.

22. The apparatus of claim 12, wherein the means for repacking the signaling message with the destination address includes:
means for discarding the local address from the first signaling message parameter; and
means for promoting the destination address to the first signaling message parameter.

23. A communications network comprising:
a first ATM network interconnected to a second ATM network, each network having an addressing format, the addressing format of the first network being different from the addressing format of the second network, the first network handling a call having an associated signaling message specifying a destination address in the second network, the first network including:
an address resolution server for translating the destination address into a local address in the addressing format of the first network;
means for repacking the signaling message with the local address as a routing address by demoting the destination address from a first signaling message parameter to a second signaling message parameter and inserting the local address into the first signaling message parameter;

means for routing the call through the first network using the local address; and means for repacking the signaling message with the destination address as the routing address.

24. The communications network of claim 23, further including:

means for forwarding the call toward the second network.

25. The communications network of claim 23, wherein the means for routing the call through the first network includes:

means for carrying the destination address transparently across the first network.

26. The communications network of claim 23, wherein the means for repacking the signaling message with the destination address includes:

means for discarding the local address from the first signaling message parameter; and means for promoting the destination address to the first signaling message parameter.

27. A method for routing a call in a communications network, the communications network comprising a first ATM network interconnected to a second ATM network, each network having an addressing format, the addressing format of the first network being different from the addressing format of the second network, the first network handling a call having an associated signaling message specifying a destination address in the second network, the method comprising the steps of:

translating the destination address into a local address in the addressing format of the first network;

repacking the signaling message with the local address as a routing address by demoting the destination address from a first signaling message parameter to a second signaling message parameter and inserting the local address into the first signaling message parameter;

routing the call through the first network using the local address; and repacking the signaling message with the destination address as the routing address.

28. The method of claim 27, further comprising the step of:

forwarding the call toward the second network.

29. The method of claim 27, wherein the step of routing the call through the first network includes the substep of:

carrying the destination address transparently across the first network.

30. The method of claim 27, wherein the step of repacking the signaling message with the destination address includes the substeps of:

discarding the local address from the first signaling message parameter; and promoting the destination address to the first signaling message parameter.

31. A method for routing a call in a communications network, the communications network having a first ATM network interconnected to a second ATM network, each network having an addressing format, the addressing format of the first network being different from the addressing format of the second network, the first network handling a call having an associated signaling message specifying a destination address, the method comprising:

translating the destination address into a local address in the addressing format of the first ATM network;

repacking the signaling message with the local address as a routing address by storing the destination address as a second signaling message parameter and inserting the local address as a first signaling message parameter;

routing the call through the first ATM network using the local address; and repacking the signaling message with the stored destination address as the routing address.

32. The method of claim 31, wherein said storing further comprises pushing the destination address on to a stack.

33. The method of claim 32, wherein said stack is a last in first out stack.

34. The method of claim 32, further comprising:
removing the destination address from the stack.

35. The method of claim 34, further comprising:
repacking the signaling message with the removed destination address.

36. The method of claim 31, further comprising:
carrying the destination address transparently across the first ATM network.

37. The method of claim 31, further comprising:
determining an additional local address in the addressing format of a third ATM network.

38. The method of claim 37, further comprising:
repacking the signaling message with the additional local address; and
routing the call through the third ATM network using the additional local address, wherein the destination address is transparently carried through the third network.

39. The method of claim 34, further comprising:
popping the local address off the stack.

40. The method of claim 31, wherein said step of translating occurs at the egress side of the first network.

41. An apparatus for routing a call in a communications network, the communications network having a first ATM network interconnected to a second ATM network, each network having an addressing format, the addressing format of the first network being different from the addressing format of the second network, the first network handling a call having an associated signaling message specifying a destination address, the apparatus comprising:

an address resolution server for translating the destination address into a local address in the addressing format of the first ATM network;

means for repacking the signaling message with the local address as a routing address by storing the destination address as a second signaling message parameter and inserting the local address as a first signaling message parameter;

means for routing the call through the first ATM network using the local address; and means for repacking the signaling message with the stored destination address as the routing address.

42. The apparatus of claim 41, wherein said means for repacking by storing further comprises means for pushing the destination address on to a stack.

43. The apparatus of claim 42, wherein said stack is a last in first out stack.

44. The apparatus of claim 42, further comprising:
means for removing the destination address from the stack.

45. The apparatus of claim 44, further comprising:
means for repacking the signaling message with the removed destination address.

46. The apparatus of claim 41, further comprising:
means for carrying the destination address transparently across the first ATM network.

47. The apparatus of claim 41, further comprising:
means for determining an additional local address in the addressing format of a third ATM network.

48. The apparatus of claim 47, further comprising:
means for repacking the signaling message with the additional local address; and
means for routing the call through the third ATM network using the additional local address, wherein the destination address is transparently carried through the third network.

49. The apparatus of claim 44, further comprising:
means for popping the local address off the stack.

50. The apparatus of claim 41, wherein said address resolution server translates at the egress side of the first network.

51. A communications network, comprising:
a first ATM network interconnected to a second ATM network, each network having an addressing format, the addressing format of the first network being different from the addressing format of the second network, the first network handling a call having an associated signaling message specifying a destination address;
an address resolution server for translating the destination address into a local address in the addressing format of the first ATM network;
means for repacking the signaling message with the local address as a routing address by storing the destination address as a second signaling message parameter and inserting the local address as a first signaling message parameter;
means for routing the call through the first ATM network using the local address; and
means for repacking the signaling message with the stored destination address as the routing address.

52. The communications network of claim 51, wherein said means for repacking by storing further comprises means for pushing the destination address on to a stack.

53. The communications network of claim 52, wherein said stack is a last in first out stack.

54. The communications network of claim 52, further comprising:
means for removing the destination address from the stack.

55. The communications network of claim 54, further comprising:
means for repacking the signaling message with the removed destination address.

56. The communications network of claim 51, further comprising:
means for carrying the destination address transparently across the first ATM network.

57. The communications network of claim 51, further comprising:
means for determining an additional local address in the addressing format of a third ATM network.

58. The communications network of claim 57, further comprising:
means for repacking the signaling message with the additional local address; and
means for routing the call through the third ATM network using the additional local address, wherein the destination address is transparently carried through the third network.

59. The communications network of claim 54, further comprising:
means for popping the local address off the stack.

60. The communications network of claim 51, wherein said address resolution server translates at the egress side of the first network.

* * * * *

UNITED STATES PATENT AND TRADEMARK OFFICE
CERTIFICATE OF CORRECTION

| | | |
|---|---|---|
| PATENT NO. | : 7,075,931 B2 | Page 1 of 1 |
| APPLICATION NO. | : 09/832823 | |
| DATED | : July 11, 2006 | |
| INVENTOR(S) | : Li et al. | |

It is certified that error appears in the above-identified patent and that said Letters Patent is hereby corrected as shown below:

In Column 3, Line 36, delete "AIM)" and insert -- AINI) --, therefor.

In Column 3, Line 66, delete "Of" and insert -- of --, therefor.

In Column 4, Line 41, delete "(xy)" and insert -- (x,y) --, therefor.

In Column 4, Line 43, delete "{xy}" and insert -- {x,y} --, therefor.

In Column 11, Line 4, delete "LAM" and insert -- IAM --, therefor.

In Column 15, Line 39, delete "LAM" and insert -- IAM --, therefor.

In Column 21, Line 23, in Claim 10, delete "network" and insert -- network-level --, therefor.

In Column 21, Line 24, in Claim 10, delete "user" and insert -- user-level --, therefor.

Signed and Sealed this
Twenty-third Day of August, 2011

David J. Kappos
*Director of the United States Patent and Trademark Office*